(12) United States Patent
Tanishima

(10) Patent No.: US 7,878,281 B2
(45) Date of Patent: Feb. 1, 2011

(54) TRANSMITTING STATE SWITCHING CONTROL APPARATUS FOR HYBRID VEHICLE

(75) Inventor: Kaori Tanishima, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 914 days.

(21) Appl. No.: 11/728,732

(22) Filed: Mar. 27, 2007

(65) Prior Publication Data

US 2007/0227790 A1  Oct. 4, 2007

(30) Foreign Application Priority Data

Mar. 29, 2006  (JP) .............................. 2006-091547

(51) Int. Cl.
*B60W 20/00* (2006.01)
*B60W 10/02* (2006.01)

(52) U.S. Cl. .................................... 180/65.265; 477/5

(58) Field of Classification Search ............ 180/65.275, 180/65.6, 65.7, 65.21, 65.265; 903/909, 903/912, 913, 914, 945, 946; 477/4, 6, 70, 477/77, 79, 86, 115, 116, 166
See application file for complete search history.

(56) References Cited

U.S. PATENT DOCUMENTS

| | | | | |
|---|---|---|---|---|
| 5,400,678 A * | 3/1995 | Jain et al. | .................... | 477/115 |
| 5,720,690 A * | 2/1998 | Hara et al. | ..................... | 477/20 |
| 5,947,863 A * | 9/1999 | Grob et al. | .................. | 477/109 |
| 6,018,198 A * | 1/2000 | Tsuzuki et al. | ................. | 290/17 |
| 6,083,138 A * | 7/2000 | Aoyama et al. | ................. | 477/5 |
| 6,176,807 B1 * | 1/2001 | Oba et al. | ....................... | 477/5 |
| 6,244,368 B1 * | 6/2001 | Ando et al. | ............. | 180/65.25 |
| 6,338,391 B1 * | 1/2002 | Severinsky et al. | ....... | 180/65.23 |
| 6,364,807 B1 * | 4/2002 | Koneda et al. | ................. | 477/5 |
| 6,368,249 B1 * | 4/2002 | Hubbard | ..................... | 477/121 |
| 6,524,219 B2 * | 2/2003 | Mesiti et al. | ................... | 477/5 |
| 6,581,705 B2 * | 6/2003 | Phillips et al. | ........... | 180/65.25 |
| 6,692,406 B2 * | 2/2004 | Beaty | .......................... | 477/32 |
| 6,847,880 B2 * | 1/2005 | Ishizu et al. | ................. | 701/95 |
| 6,852,062 B1 * | 2/2005 | Ahner et al. | .................... | 477/2 |
| 6,997,275 B2 * | 2/2006 | Mesiti et al. | ............. | 180/65.25 |
| 7,062,986 B2 * | 6/2006 | Metzger et al. | ............... | 74/335 |
| 7,131,510 B2 * | 11/2006 | Mesiti et al. | ............. | 180/65.25 |
| 7,131,933 B2 * | 11/2006 | Tabata | ........................ | 477/181 |
| 7,347,803 B2 * | 3/2008 | Kobayashi et al. | ............. | 477/5 |
| 7,351,182 B2 * | 4/2008 | Kobayashi | ..................... | 477/5 |
| 7,360,616 B2 * | 4/2008 | Schiele | .................. | 180/65.265 |

(Continued)

FOREIGN PATENT DOCUMENTS

JP  10-002241  1/1998

(Continued)

*Primary Examiner*—J. Allen Shriver, II
*Assistant Examiner*—Jacob Meyer
(74) *Attorney, Agent, or Firm*—Young Basile

(57) ABSTRACT

A control apparatus for a hybrid vehicle for controlling and limiting the transmission of power from an engine to the driving wheels during start-up of the engine to produce a hybrid running mode where the vehicle is powered by both the engine and a motor-generator. During start-up of the engine, a first frictional element changing its state before and after a shift of the transmission is allowed to slip, and a second frictional element is allowed to slip. The element that is allowed to slip is switched from one to the other.

20 Claims, 17 Drawing Sheets

U.S. PATENT DOCUMENTS

| | | | |
|---|---|---|---|
| 7,472,769 B2* | 1/2009 | Yamanaka et al. | 180/65.25 |
| 2003/0153429 A1* | 8/2003 | Boll | 477/6 |
| 2004/0152558 A1* | 8/2004 | Takami et al. | 477/3 |
| 2005/0054480 A1* | 3/2005 | Ortmann et al. | 477/6 |
| 2005/0090370 A1* | 4/2005 | Berger et al. | 477/167 |
| 2005/0155803 A1* | 7/2005 | Schiele | 180/65.2 |
| 2005/0197233 A1* | 9/2005 | Hoshiya et al. | 477/39 |
| 2007/0056783 A1* | 3/2007 | Joe et al. | 180/65.2 |
| 2007/0102205 A1* | 5/2007 | Yamanaka et al. | 180/65.1 |
| 2007/0102207 A1* | 5/2007 | Yamanaka et al. | 180/65.3 |
| 2007/0102208 A1* | 5/2007 | Okuda et al. | 180/65.3 |
| 2007/0275823 A1* | 11/2007 | Motosugi et al. | 477/176 |
| 2007/0276557 A1* | 11/2007 | Motosugi et al. | 701/22 |
| 2008/0006457 A1* | 1/2008 | Fujimoto et al. | 180/65.1 |
| 2008/0071437 A1* | 3/2008 | Hirata et al. | 701/22 |

FOREIGN PATENT DOCUMENTS

| | | |
|---|---|---|
| JP | 11-082260 | 3/1999 |
| JP | 2000-224714 | 8/2000 |

* cited by examiner

FIG.6

| SHIFT FRICTIONAL ELEMENT / SHIFT SPEED | I/C | H&LR/C | D/C | R/B | Fr/B | LC/B | FWD/B | 1st/OWC | 3rd/OWC | FWD/OWC |
|---|---|---|---|---|---|---|---|---|---|---|
| 1st | | ● | | | ● | ● | ○ | ○ | ○ | ○ |
| 2nd | | | ○ | | ● | ● | ○ | | ○ | ○ |
| 3rd | | ○ | ○ | | ● | | ○ | | ○ | |
| 4th | ○ | ○ | ○ | | | | ○ | | | |
| 5th | ○ | ○ | | | ○ | | ○ | | | |
| Rev. | | ● | | ○ | ● | | | ○ | ○ | |

FIG.10

IN CASE THAT SHIFT REQUEST ARISES BEFORE ENGINE STARTING UNDER SECOND CLUTCH ≠ DISENGAGEMENT ELEMENT (Fr/B) ≠ ENGAGEMENT ELEMENT (D/C)

| | | | |
|---|---|---|---|
| I | EV MODE | | ENG ╫ (MG) ▯ ⊗ |
| II | EV MODE ↓ MOTOR RUNNING REQUEST ↓ SLIP OF SECOND CLUTCH 7 | | ENG ╫ (MG) ▨ ⊗ |
| III | SHIFT REQUEST ↓ REPLACEMENT FROM SECOND CLUTCH 7 TO Fr/B | D/C PRE-CHARGE & STANDBY CONTROL DURING THIS TIME PERIOD (UNNECESSARY IN CASE OF ONE-WAY CLUTCH) | ENG ╫ (MG) ▨ ⊗ |
| IV | TRANSITION OF ENGAGEMENT OF FIRST CLUTCH 6 (ENGINE STARTING INITIATION) | ↑ | ENG ▩ (MG) ▨ ⊗ |
| V | RETENTION OF DRIVING FORCE IN Fr/B (DURING SHIFT) | COMPLETION OF ENGAGEMENT OF SECOND CLUTCH DURING THIS TIME PERIOD | ENG ╂ (MG) ▨ ⊗ |
| VI | RETENTION OF DRIVING FORCE IN D/C (DURING SHIFT) | TORQUE DOWN BY MOTOR AND ENGINE DURING THIS TIME PERIOD | ENG ╂ (MG) ▨ ⊗ |
| VII | HEV MODE | ASSIST ENGINE RESPONSE DELAY BY MOTOR | ENG ╂ (MG) ▮ ⊗ |

╫ : DISENGAGEMENT    ▨ : SLIP    ╂ : ENGAGEMENT

FIG.11

IN CASE THAT SHIFT REQUEST ARISES BEFORE ENGINE
STARTING UNDER SECOND CLUTCH = DISENGAGEMENT
ELEMENT (Fr/B) ≠ ENGAGEMENT ELEMENT (D/C)

| | | | |
|---|---|---|---|
| I | EV MODE | | 1 6 5 Fr/B 3 8 ENG ┃┃ (MG) ▊ ⊗ |
| II | EV MODE ↓ MOTOR RUNNING REQUEST ↓ SLIP OF SECOND CLUTCH 7 | | 1 6 5 Fr/B 3 8 ENG ┃┃ (MG) ▊▊ ⊗ |
| IV | TRANSITION OF ENGAGEMENT OF FIRST CLUTCH 6 (ENGINE STARTING INITIATION) | D/C PRE-CHARGE & STANDBY CONTROL DURING THIS TIME PERIOD (UNNECESSARY IN CASE OF ONE-WAY CLUTCH) | 1 6 5 Fr/B 3 8 ENG ▊▊ (MG) ▊▊ ⊗ |
| V | RETENTION OF DRIVING FORCE IN Fr/B (DURING SHIFT) | COMPLETION OF ENGAGEMENT OF SECOND CLUTCH DURING THIS TIME PERIOD | 1 6 5 Fr/B 3 8 ENG ┃ (MG) ▊▊ ⊗ |
| VI | RETENTION OF DRIVING FORCE IN D/C (DURING SHIFT) | TORQUE DOWN BY MOTOR AND ENGINE DURING THIS TIME PERIOD | 1 6 5 D/C 3 8 ENG ┃ (MG) ▊▊ ⊗ |
| VII | HEV MODE | ASSIST ENGINE RESPONSE DELAY BY MOTOR | 1 6 5 D/C 3 8 ENG ┃ (MG) ▊ ⊗ |

┃┃ : DISENGAGEMENT    ▊▊ : SLIP    ┃ : ENGAGEMENT

FIG.12

IN CASE THAT SHIFT REQUEST ARISES AFTER ENGINE STARTING UNDER SECOND CLUTCH = DISENGAGEMENT ELEMENT (Fr/B) ≠ ENGAGEMENT ELEMENT (D/C)

| | | | |
|---|---|---|---|
| I | EV MODE | | 1  6  5  Fr/B  3  8<br>ENG —‖— MG —‖— ⊗ |
| II | EV MODE<br>↓<br>MOTOR RUNNING REQUEST<br>↓<br>SLIP OF SECOND CLUTCH (Fr/B) | | 1  6  5  Fr/B  3  8<br>ENG —‖— MG — ▯ — ⊗ |
| III | TRANSITION OF ENGAGEMENT OF FIRST CLUTCH (ENGINE STARTING) | | 1  6  5  Fr/B  3  8<br>ENG — MG — ▯ — ⊗ |
| IV | SHIFT REQUEST<br>↓<br>RETENTION OF DRIVING FORCE IN Fr/B (DURING SHIFT) | ↕ D/C PRE-CHARGE & STANDBY CONTROL DURING THIS TIME PERIOD (UNNECESSARY IN CASE OF ONE-WAY CLUTCH)<br>↕ COMPLETION OF ENGAGEMENT OF SECOND CLUTCH DURING THIS TIME PERIOD | 1  6  5  Fr/B  3  8<br>ENG — MG — ▯ — ⊗ |
| V | RETENTION OF DRIVING FORCE IN D/C (DURING SHIFT) | ↑ TORQUE DOWN BY MOTOR AND ENGINE DURING THIS TIME PERIOD | 1  6  5  D/C  3  8<br>ENG — MG — ▯ — ⊗ |
| VI | HEV MODE | ↑ ASSIST ENGINE RESPONSE DELAY BY MOTOR | 1  6  5  D/C  3  8<br>ENG — MG — ▮ — ⊗ |

—‖— : DISENGAGEMENT     —▯— : SLIP     —▮— : ENGAGEMENT

FIG.13

IN CASE THAT SHIFT REQUEST ARISES BEFORE ENGINE STARTING UNDER SECOND CLUTCH = ENGAGEMENT ELEMENT (D/C) ≠ DISENGAGEMENT ELEMENT (Fr/B)

| I | EV MODE | |
|---|---|---|
| II | EV MODE ↓ MOTOR RUNNING REQUEST ↓ D/C SLIP ↓ SHIFT REQUEST ↓ Fr/B DISENGAGEMENT INITIATION | 3 (Fr/B DISENGAGEMENT INITIATION) |
| III | TRANSITION OF ENGAGEMENT OF FIRST CLUTCH (ENGINE STARTING) RETENTION OF DRIVING FORCE IN D/C | TERMINATION OF Fr/B DISENGAGEMENT DURING THIS TIME PERIOD |
| IV | RETENTION OF DRIVING FORCE IN D/C (DURING SHIFT) | TORQUE DOWN BY MOTOR AND ENGINE DURING THIS TIME PERIOD |
| V | HEV MODE | ASSIST ENGINE RESPONSE DELAY BY MOTOR |

─‖─ : DISENGAGEMENT   ─▯▯─ : SLIP   ─▮─ : ENGAGEMENT

FIG.14

IN CASE THAT SHIFT REQUEST ARISES AFTER ENGINE
STARTING UNDER SECOND CLUTCH = ENGAGEMENT
ELEMENT (D/C) ≠ DISENGAGEMENT ELEMENT (Fr/B)

| | | |
|---|---|---|
| I | EV MODE | 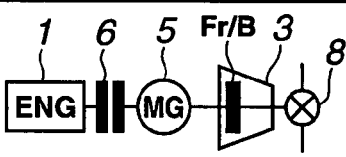 |
| II | EV MODE<br>↓<br>MOTOR RUNNING REQUEST<br>↓<br>D/C SLIP | 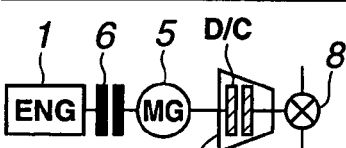<br>3 (Fr/B DISENGAGEMENT INITIATION) |
| III | TRANSITION OF ENGAGEMENT OF FIRST CLUTCH (ENGINE STARTING)<br>RETENTION OF DRIVING FORCE IN D/C | TERMINATION OF Fr/B DISENGAGEMENT DURING THIS TIME PERIOD | 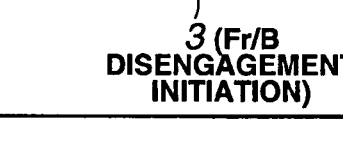 |
| IV | SHIFT REQUEST<br>↓<br>RETENTION OF DRIVING FORCE IN D/C (DURING SHIFT) | TORQUE DOWN BY MOTOR AND ENGINE DURING THIS TIME PERIOD | 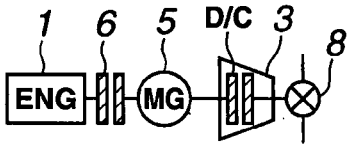<br>3 (Fr/B DISENGAGEMENT) |
| V | HEV MODE | ASSIST ENGINE RESPONSE DELAY BY MOTOR | 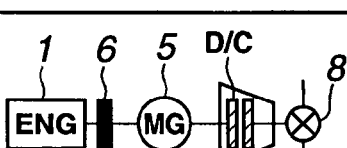 |

─┨┠─ : DISENGAGEMENT    ─┨╏┠─ : SLIP    ─┨─ : ENGAGEMENT

FIG.15

SHIFT CONTROL IN HEV MODE
UNDER SECOND CLUTCH ≠ DISENGAGEMENT
ELEMENT (Fr/B) ≠ ENGAGEMENT ELEMENT (D/C)

| | | | |
|---|---|---|---|
| I | HEV MODE ↓ SHIFT REQUEST | | 1 ENG — 6 — 5 MG — 7 — 3 — 8 |
| II | REPLACEMENT OF SECOND CLUTCH AND DISENGAGEMENT ELEMENT (Fr/B) ↓ RETENTION OF DRIVING FORCE IN Fr/B (DURING SHIFT) | COMPLETION OF ENGAGEMENT OF SECOND CLUTCH DURING THIS TIME PERIOD<br><br>TERMINATION OF Fr/B DISENGAGEMENT DURING THIS TIME PERIOD | 1 ENG — 6 — 5 MG — Fr/B — 3 — 8 |
| III | RETENTION OF DRIVING FORCE IN D/C (DURING SHIFT) | TORQUE DOWN BY MOTOR AND ENGINE DURING THIS TIME PERIOD | 1 ENG — 6 — 5 MG — D/C — 3 — 8 |
| IV | HEV MODE | ASSIST ENGINE RESPONSE DELAY BY MOTOR | 1 ENG — 6 — 5 MG — D/C — 3 — 8 |

─┤├─ : DISENGAGEMENT   ─┤▓├─ : SLIP   ─┼─ : ENGAGEMENT

TRANSMITTING STATE SWITCHING CONTROL APPARATUS FOR HYBRID VEHICLE

CROSS REFERENCE TO RELATED APPLICATIONS

This application claims priority to Japanese Patent Application No. 2006-091547, filed Mar. 29, 2006, which is incorporated herein in its entirety by reference.

TECHNICAL FIELD

The present invention relates in general to a hybrid vehicle capable of running by a motive power from a motor-generator, independent of a separate traditional combustion engine, and which has an electric running (EV) mode that runs only by the motive power from the motor-generator, and a hybrid running mode (HEV) mode that can run by the motive power from both of the engine and the motor-generator, and more particularly to a controlling apparatus for switching between an electric running mode and a hybrid running mode.

BACKGROUND

There are known hybrid driving devices, for example, those disclosed in Japanese Patent Application Publication No. H11-082260, which generally include a motor-generator disposed between an engine and a transmission, a first clutch arranged to connect and disconnect between the engine and the motor-generator, and a second clutch arranged to connect and disconnect the motor-generator and a transmission output shaft. These known devices switch between an EV and HEV mode through engagement and disengagement of a first and second clutch depending on the driving force requested. However, the known devices do not provide for the control apparatus and techniques to effectively or efficiently switch between running modes.

SUMMARY

In one embodiment of the invention, an apparatus is provided for controlling a hybrid vehicle having an engine, a motor-generator, and a clutch disposed between the engine and the motor and configured to vary a transmitted torque capacity. The apparatus includes a transmission disposed between the motor-generator and at least one driving wheel having at least two power transmitting paths through the selective engagement of at least one of a plurality of frictional engagement elements. The apparatus also includes a controller that is operable to transition the vehicle from an electric running mode to a hybrid running mode. The controller is configured to selectively permit a slip state where at least one of the frictional engagement elements is allowed to slip during transition to the hybrid running mode from the electric running mode so as to control the driving force transmitted to the at least one driving wheel.

In accordance with other embodiments of the invention, a hybrid vehicle is provided. The vehicle includes an engine, a motor-generator, a clutch disposed between the engine and the motor-generator configured to vary a transmitted torque capacity, and a transmission disposed between the motor-generator and at least one driving wheel. The transmission has at least two power transmitting paths through selected engagement of a plurality of frictional engagement elements. The vehicle also includes a controller that is operable to transition the vehicle from an electric running mode to a hybrid running mode. The controller is configured to selectively permit a slip state where at least one of the frictional engagement elements is allowed to slip during transition to the hybrid running mode from the electric running mode so as to control the driving force transmitted to the at least one driving wheel.

In accordance with another embodiment of the invention, a method is provided for controlling a hybrid vehicle having an engine, a motor-generator, a clutch disposed between the engine and the motor and configured to vary a transmitted torque capacity, a transmission disposed between the motor-generator and at least one driving wheel, and a plurality of frictional engagement elements positioned between the motor-generator and the at least one driving wheel. The method includes transitioning the vehicle from an electric running mode to a hybrid running mode; and allowing at least one of the plurality of frictional engagement elements to slip during transition to the hybrid running mode from the electric running mode so as to control the transmission of power from the engine to the at least one driving wheel during start up of the engine.

BRIEF DESCRIPTION OF DRAWINGS

This description herein makes reference to the accompanying drawings wherein like reference numerals refer to like parts throughout the several views, and wherein:

FIG. 6 is an engagement logic diagram table showing the relationship between the combination of shift frictional elements in the automatic transmission shown in FIG. 4, and the selected shift speed of the automatic transmission.

FIG. 10 is an operation time chart of the 5→4 downshift control and the EV→HEV mode switching control which are performed by the integral controller in the control system shown in FIG. 7

FIG. 11 is an operation time chart of the 5→4 downshift control and the EV→HEV mode switching control in the case of using a disengagement side frictional element as a second clutch.

FIG. 12 is an operation time chart of the EV→HEV mode switching control and the 5→4 downshift control in the case of using the disengagement side frictional element as the second clutch.

FIG. 13 is an operation time chart of the 5→4 downshift control and the EV→HEV mode switching control in the case of using the engagement side frictional elements as the second clutch.

FIG. 14 is an operation time chart of the EV→HEV mode switching control and the 5→4 downshift control in the case of using the engagement side frictional elements as the second clutch.

FIG. 15 is an operation time chart showing a shift control in the HEV mode in the case of using, as the second clutch, the shift frictional elements keeping an engagement state during the shift.

DETAILED DESCRIPTION

Referring to FIGS. 1-17, embodiments are described in detail with reference to the drawings.

Figure 1:
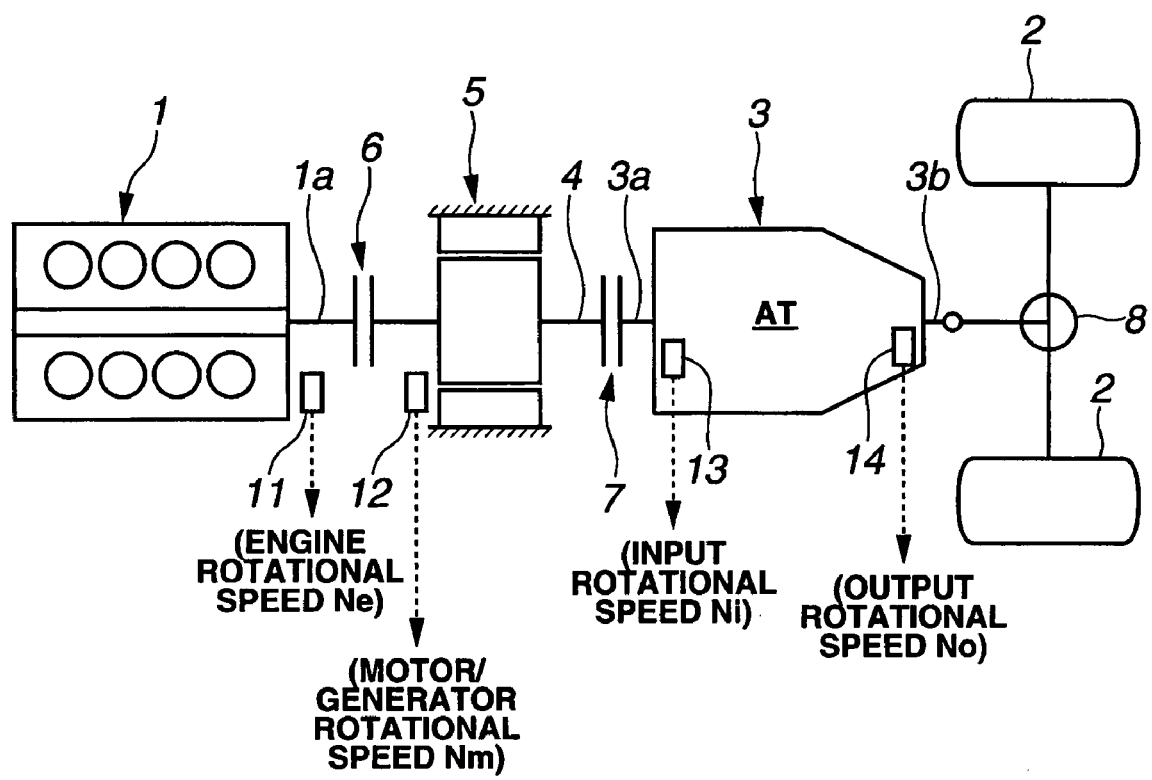
FIG. 1 is a schematic view showing a powertrain of a hybrid vehicle which can employ a transmitting state switching control apparatus according to the present invention.

FIG. 1 shows a generally known powertrain of a hybrid vehicle of a front engine rear wheel drive-type which is equipped with a hybrid driving apparatus that can employ a control apparatus according to the present invention. The apparatus includes a conventional combustion engine 1 and rear driving wheels 2.

In the powertrain of the hybrid vehicle as shown in FIG. 1, an automatic transmission 3 is disposed in tandem in a rear direction of engine 1 like a general rear wheel drive vehicle.

A motor-generator 5 is arranged to operate as a motor, or to operate as a generator (an electric generator), and is positioned between engine 1 and automatic transmission 3.

A first clutch 6 is positioned between the motor-generator 5 and engine 1, that is, between a shaft 4 and an engine crank shaft 1a. First clutch 6 can disconnect engine 1 from motor-generator 5. First clutch 6 is arranged to vary a transmitted torque capacity in a stepless manner or in a stepwise manner. For example, first clutch 6 is composed of a wet type multiple plate clutch arranged to vary the transmitted torque capacity by regulating the flow quantity of a clutch hydraulic fluid and the pressure of the clutch hydraulic fluid continuously by a proportional solenoid.

A second clutch 7 is disposed between motor-generator 5 and automatic transmission 3, that is, between shaft 4 and a transmission input shaft 3a, and can disconnect the motor-generator 5 from transmission 3. As used herein, second clutch is intended to mean a clutch to generate or permit a slip state or condition so as not to transmit the rotation variation at the engine start-up when the first clutch is engaged as described later.

Second clutch 7 is arranged to vary the transmitted torque capacity in a stepless manner or in a stepwise manner like first clutch 6. For example, second clutch 7 is composed of a wet type multiple plate clutch arranged to vary the transmitted torque capacity by regulating a flow quantity of the clutch hydraulic fluid and the pressure of the clutch hydraulic fluid continuously by a proportional solenoid.

Automatic transmission 3 may be similar or identical to an automatic transmission described on pages C-9-C-22 of "SKYLINE new car model (CV35 type car) description" issued by NISSAN MOTOR CO., LTD. This automatic transmission 3 is arranged to determine a transmitting path (shift speed) by combination of the engagement and the disengagement of shift frictional elements by selectively engaging and disengaging a plurality of shift frictional elements (such as clutch and brake). Accordingly, automatic transmission 3 varies the speed of rotation from input shaft 3a by gear ratio in accordance with a selected shift speed, and outputs to an output shaft 3b.

This output rotation is divided and transmitted to the left and right rear wheels 2 by a differential gear device 8 used for the running of the vehicle.

However, automatic transmission 3 is not limited to the above-described stepped type, and may employ a continuously variable transmission.

Figure 4:
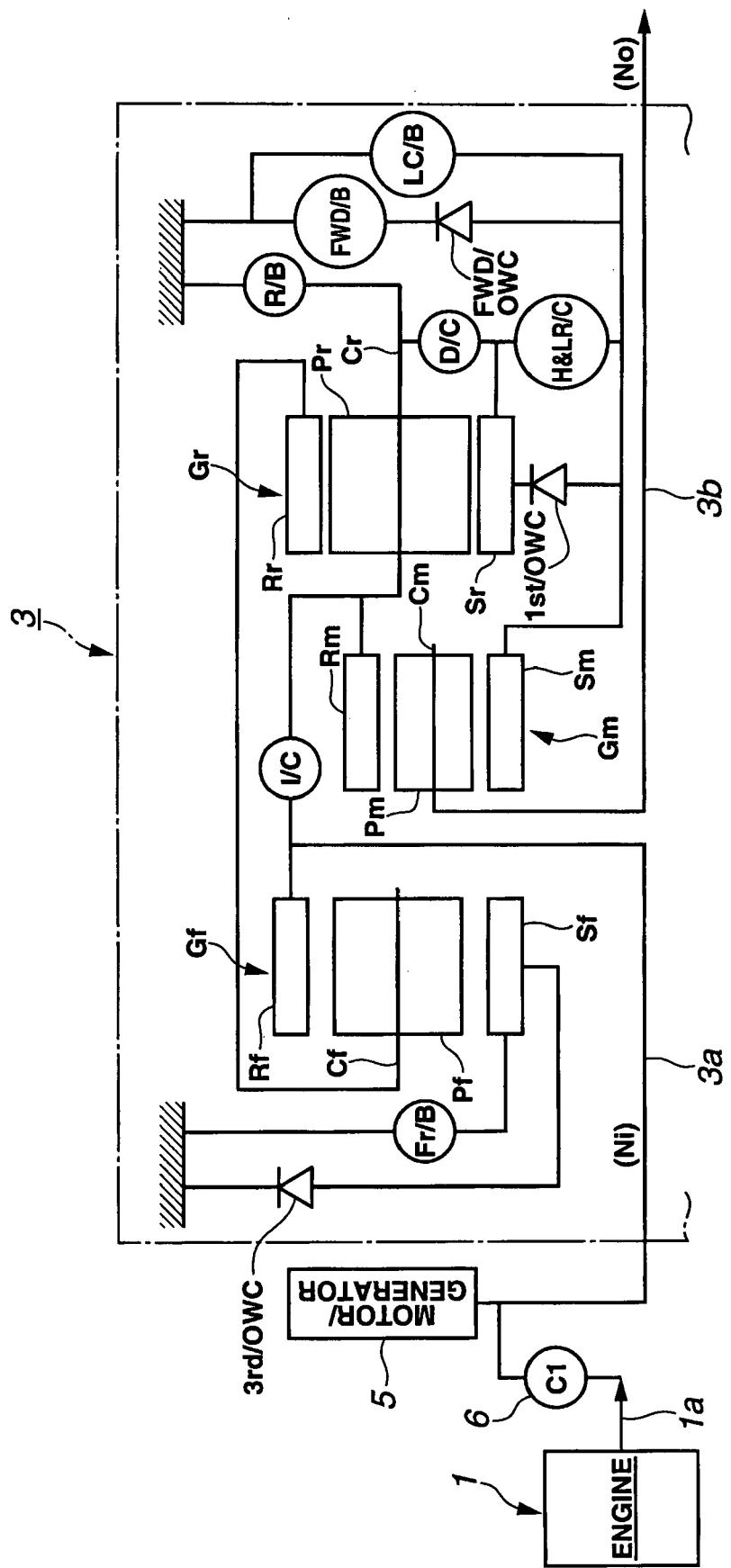
FIG. 4 is a schematic diagram showing an automatic transmission in the powertrains shown in FIGS. 1-3.

FIG. 4 shows automatic transmission 3, and is described below. Input shaft 3a and output shaft 3b are disposed in a coaxial abutting relation. On these input and output shafts 3a and 3b, there are provided a front planetary gear set Gf, a center planetary gear set Gm, and a rear planetary gear set Gr which are disposed in this order from side of engine 1 and motor-generator 5. These are the main components of the planetary gear mechanism of automatic transmission 3.

Front planetary gear set Gm located nearest to engine 1 and motor-generator 5 is a simple planetary gear set including a front sun gear Sf, a front ring gear Rf, front pinions Pf engaging with these gears, and a front carrier Cf rotatably supporting the front pinions.

Center planetary gear set Gm located next nearer to engine and 1 motor-generator 5 is a simple planetary gear set including a center sun gear Sm, a center ring gear Rm, center pinions Pm engaging with these gears, and a center carrier Cm rotatably supporting the center pinions.

Rear planetary gear set Gr located farthest from engine 1 and motor-generator 5 is a simple planetary gear set including a rear sun gear Sr, a rear ring gear Rr, rear pinions Pr engaging with these gears, and a rear carrier Cr rotatably supporting the rear pinions.

A front brake Fr/B, an input clutch I/C, a high and low reverse clutch H&LR/C, a direct clutch D/C, a reverse brake R/B, a low coast brake LC/B, and a forward brake FWD/B are provided as shift frictional elements to determine a transmitting path (shift speed) of the planetary gear shift mechanism. These shift frictional elements, a third speed one-way clutch 3rd/OWC, a first speed one-way clutch 1st/OWC, and a forward one-way clutch FWD/OWC constitute the planetary gear shift mechanism of automatic transmission 3 with the above-described components of planetary gear sets Gf, Gm, and Gr as illustrated below.

Front ring gear Rf is connected with input shaft 3a, and center ring gear Rm can be connected with input shaft 3a by input clutch I/C.

Front sun gear Sf is arranged not to rotate in opposite direction of the rotation direction of engine 1 through third speed one-way clutch 3rd/OWC, and arranged to be fixed by front brake Fr/B disposed in parallel with third speed one-way clutch 3rd/OWC.

Front carrier Cf and rear ring gear Rr are connected with each other, and center ring gear Rm and rear carrier Cr are connected with each other.

Center carrier Cm is connected with output shaft 3b. Between center sun gear Sm and rear sun gear Sr, center sun gear Sm is arranged not to rotate with respect to rear sun gear Sr in the opposite direction of the rotation direction of engine 1 through first speed one-way clutch 1st/OWC. Moreover, center sun gear Sm and rear sun gear Sr can be connected with each other by high and low reverse clutch H&LR/C.

Direct clutch D/C can connect between rear sun gear Sr and rear carrier Cr, and rear carrier Cr can be fixed by reverse brake R/B.

Moreover, center sun gear Sm is arranged not to rotate in the opposite direction of engine 1, in an engagement state of forward brake FWD/B, by forward brake FWD/B and forward one-way clutch FWD/OWC. Moreover, center sun gear Sm can be fixed by low coast brake LC/B. Therefore, low coast brake LC/B is disposed in parallel with forward brake FWD/B and forward one-way clutch FWD/OWC.

Figure 5:
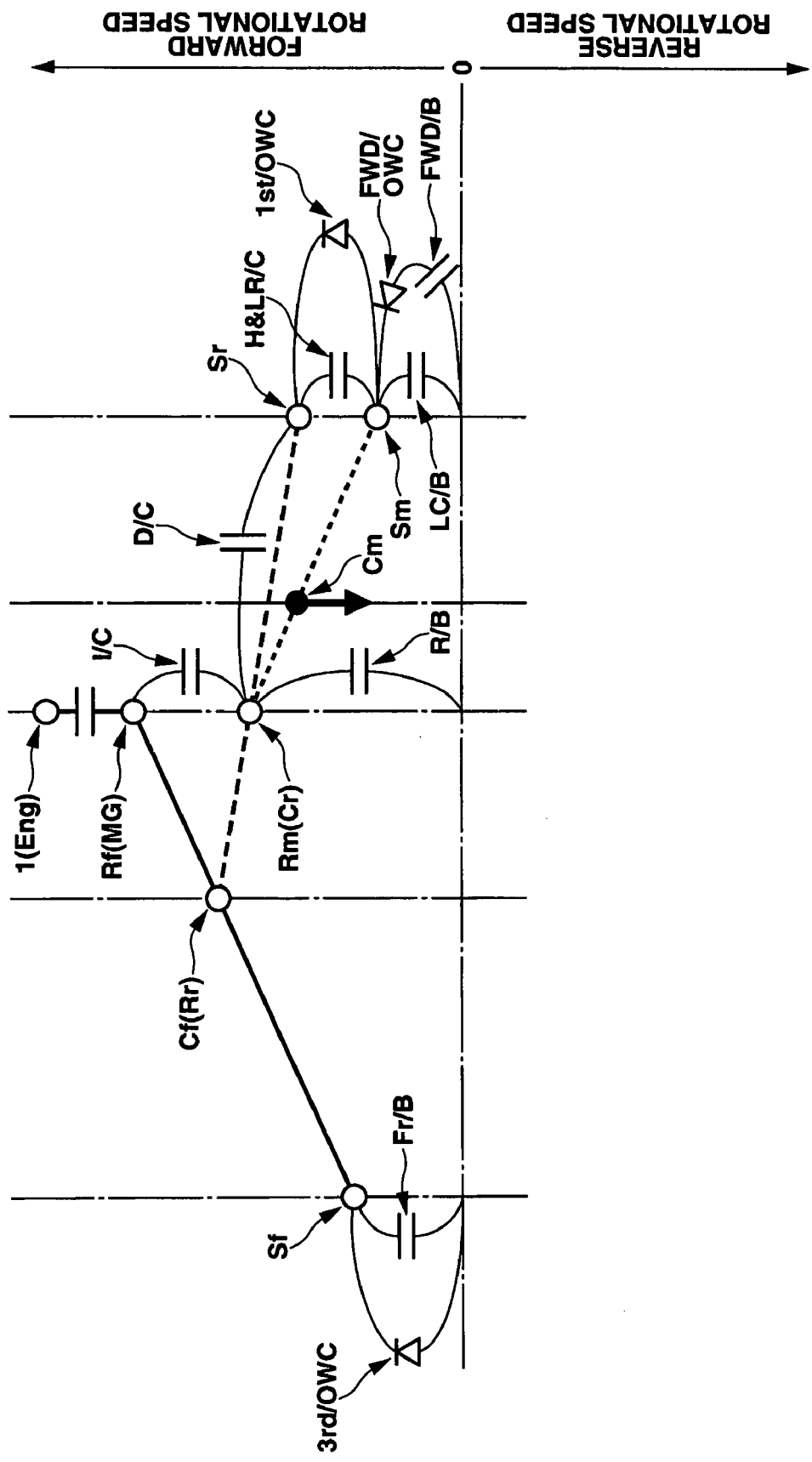
FIG. 5 is a schematic speed diagram of the automatic transmission shown in FIG. 4.

FIG. 5 shows a driveline of the above-mentioned planetary gear shift mechanism by a shift diagram. It is possible to attain forward shift speeds of a forward first speed (1st), a forward second speed (2nd), a forward third speed (3rd), a forward fourth speed (4th), and a forward fifth speed (5th), and a reverse speed (Rev), by selective engagement of seven shift frictional elements Fr/B, I/C, H&LR/C, R/B, D/C, LC/B, and FWD/B, and three one-way clutch 3rd/OWC, 1st/OWC and FWD/OWC, as shown in ○ mark and ● mark (at engine braking) in FIG. 6.

In the powertrain of FIG. 1 which is equipped with the above-described automatic transmission 3, in a situation or case in which there is a request of an electric running (EV) mode used at a low load and low vehicle speed including a start from a stop state, first clutch 6 is disengaged, and second clutch 7 is engaged, so that automatic transmission 3 is brought to the power transmitting state.

In a case in which motor-generator 5 is driven in this state, the only output rotation from motor-generator 5 reaches transmission input shaft 3a. Automatic transmission 3 varies the speed of the rotation to input shaft 3a in accordance with the selected shift speed, and outputs from transmission output shaft 3b.

The rotation from transmission output shaft 3b is transmitted through differential gear device 8 to rear wheels 2, and the vehicle can be run by the electric running (EV running) mode only by motor-generator 5.

At high speed running and large load running, in a case in which there is a request of a hybrid running (HEV running) mode used in a case in which the usable electric power is low, both of first clutch 6 and second clutch 7 are engaged, so that automatic transmission 3 is brought to the power transmitting state.

In this state, the output rotation from engine 1, or both of the output rotation from engine 1 and the output rotation from motor-generator 5 reaches transmission input shaft 3a, and automatic transmission 3 varies the speed of the rotation to input shaft 3a in accordance with the selected shift speed, and outputs this rotation from transmission output shaft 3b.

The rotation from transmission output shaft 3b is transmitted through differential gear device to rear wheels 2, and the vehicle can be run by the hybrid running (HEV running) mode by engine 1 and motor-generator 5.

During this HEV running, in a case in which the energy is redundant when engine 1 is driven by optimal mileage, motor-generator 5 is operated as the generator by this redundant energy so as to convert the redundant energy to the electric power. This generated electric power is stored for using the motor driving of motor-generator 5, and accordingly, it improves the mileage or fuel economy of engine 1.

In FIG. 1, clutch 7 arranged to connect and disconnect between motor-generator 5 and driving wheels 2 is disposed between motor-generator and automatic transmission 3. However, second clutch 7 can be disposed between automatic transmission 3 and differential gear device 8 as shown in FIG. 2, so as to function in the same way.

Figure 2:
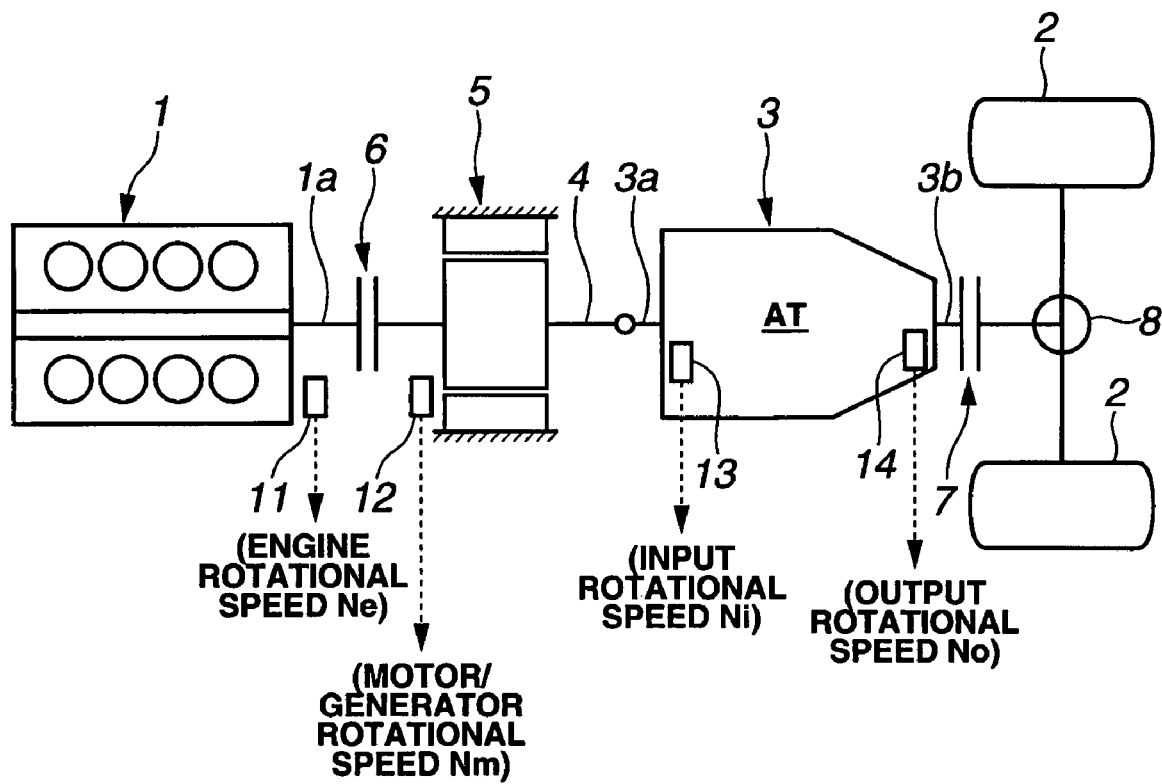
FIG. 2 is a schematic view showing another powertrain of a hybrid vehicle which can employ the transmitting state switching control apparatus according to the present invention.

In FIGS. 1 and 2, second clutch 7 is added forward or rearward of automatic transmission 3. Alternatively, it is optional to commonly use the shift frictional engagement elements for selecting the forward shift speed or the shift frictional engagement elements for selecting the reverse shift speed which exist in automatic transmission 3, as shown in FIG. 3.

The shift frictional engagement elements of automatic transmission 3 which are commonly used as second clutch 7 will be described later.

In this case, second clutch 7 performs the above-described mode select function. In addition, the automatic transmission is brought to the power transmitting state by the shift to the corresponding shift speed when second clutch 7 is engaged to attain this function. Accordingly, it is highly advantageous in cost because the second clutch is not needed.

Figure 3:
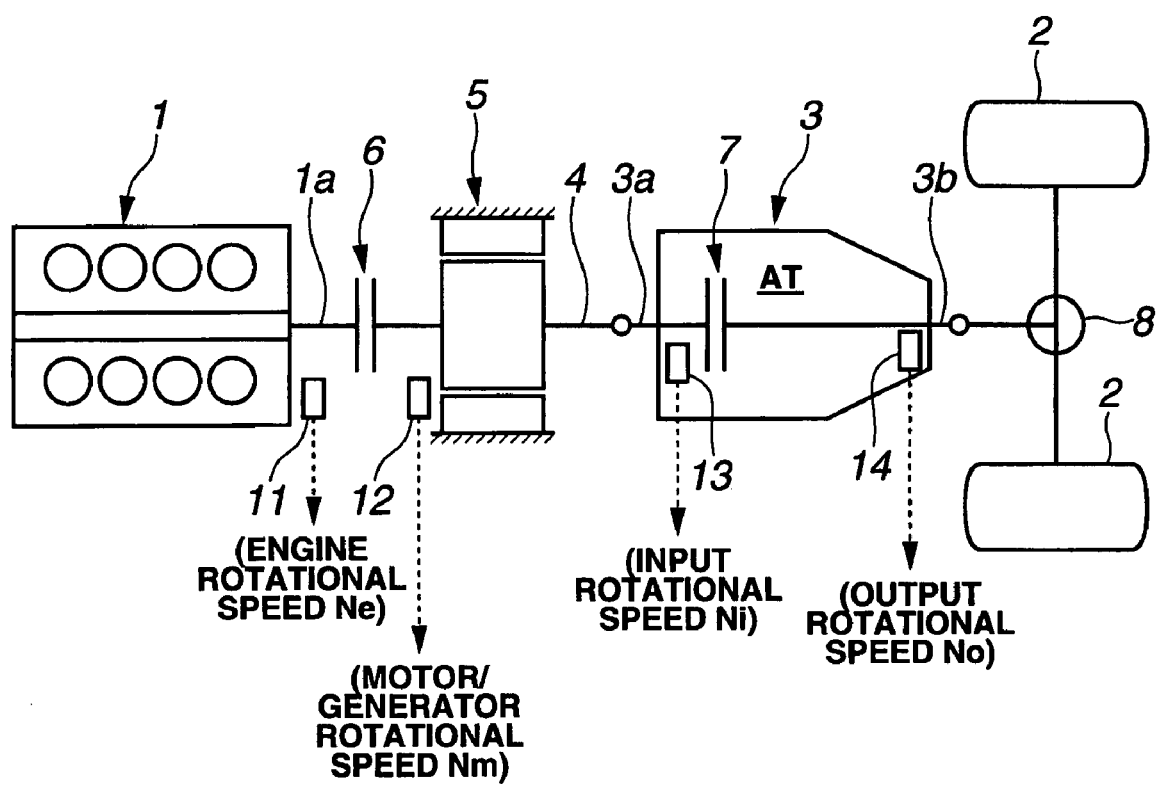
FIG. 3 is a schematic plan view showing still another powertrain of a hybrid vehicle which can employ the transmitting state switching control apparatus according to the present invention.
Figure 7:
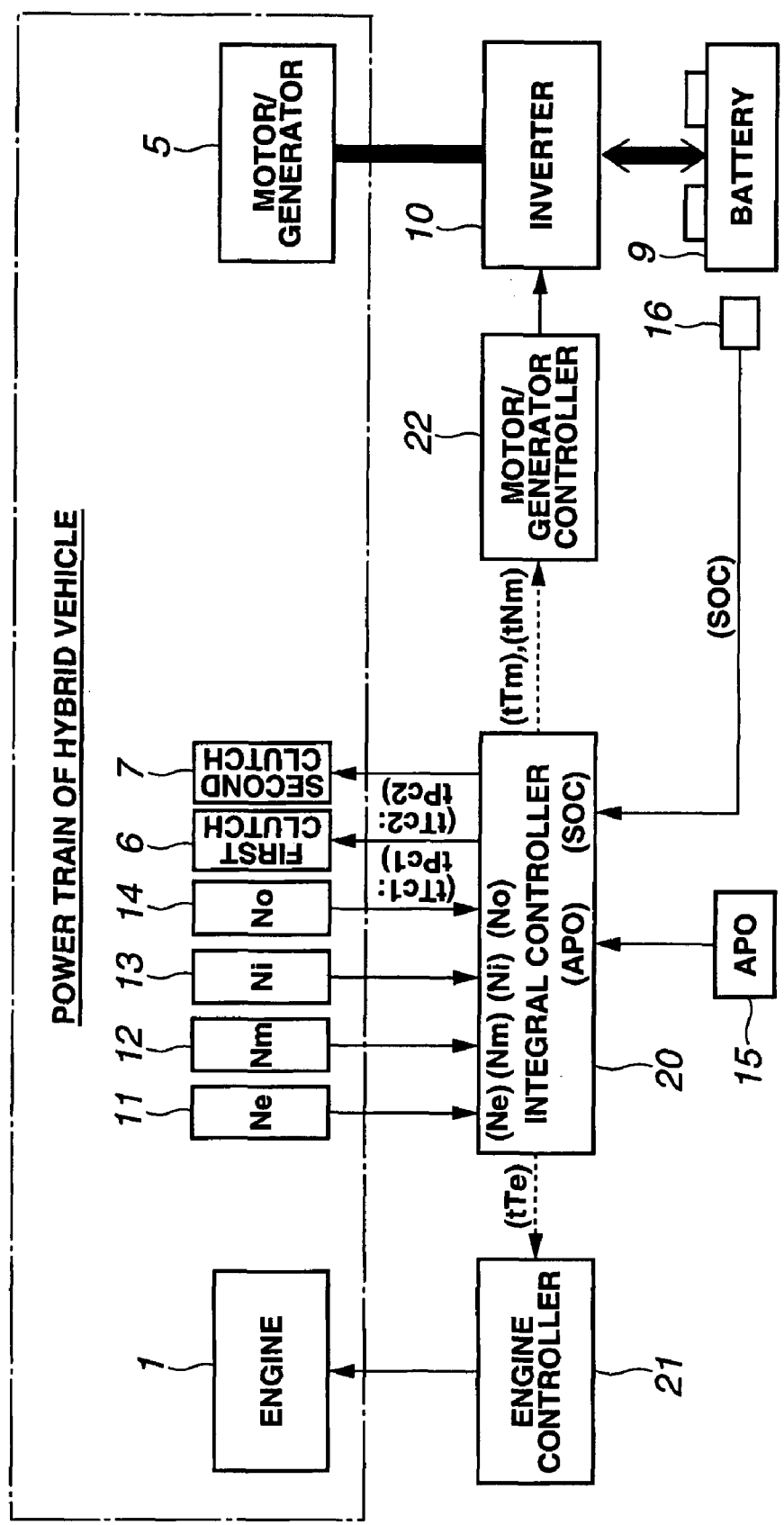
FIG. 7 is a schematic block diagram showing a control system of the powertrain shown in FIG. 3.

Engine 1, motor-generator 5, first clutch 6 and second clutch 7 constituting the powertrain of the hybrid vehicle as shown in FIGS. 1-3 are controlled by a system as shown in FIG. 7.

The below-described description illustrates a case in which the powertrain is the powertrain shown in FIG. 3 (the powertrain that the existing shift frictional elements in automatic transmission 3 are commonly used as second clutch 7).

The control system in FIG. 7 is equipped with an integral controller 20 arranged to perform an integral control of an operating point of the powertrain. The control system defines the operating point of the powertrain by a target engine torque tTe, a target motor-generator torque tTm (or target motor-generator rotational speed tNm), a target transmitted torque capacity tTc1 (a first clutch command pressure tPc1) of first clutch 6, a target transmitted torque capacity tTc2 (a second clutch command pressure tPc2) of second clutch 7.

For determining the operating point of the powertrain, integral controller 20 receives a signal from an engine rotation sensor 11 arranged to sense an engine rotational speed Ne, a signal from a motor-generator rotation sensor 12 arranged to sense a motor-generator rotational speed Nm, a signal from an input rotation sensor 13 arranged to sense a transmission input rotational speed Ni, a signal from an output rotation sensor 14 arranged to sense a transmission output rotational speed No, a signal from an accelerator opening sensor 15 arranged to sense an accelerator depression quantity (an accelerator opening APO) indicative of request load state of engine 1, and a signal from a storage state sensor 16 arranged to sense a battery state of charge SOC of a battery 9 which stores the electric power for motor-generator 5.

Engine rotation sensor 11, motor-generator rotation sensor 12, input rotation sensor 13, and output rotation sensor 14 of the above-described sensors can be disposed as shown in FIGS. 1-3.

Integral controller 20 selects the driving mode (the EV mode, the HEV mode) that can achieve the driving force of the vehicle desired by the driver from accelerator opening APO, battery state of charge SOC and transmission output rotational speed No (vehicle speed VSP) of the above-described input information. Integral controller 20 also calculates target engine torque tTe, target motor-generator torque tTm (or target motor-generator rotational speed tNm), target first clutch transmitted torque capacity tTc1 (or first clutch command pressure tPc1), and target second transmitted torque capacity tTc2 (second clutch command pressure tPc2).

Target engine torque tTe is supplied to engine controller 21, and target motor-generator torque tTm is supplied to motor-generator controller 22.

Engine controller 21 controls engine 1 so that an engine torque Te becomes target engine torque tTe.

Motor-generator controller 22 controls motor-generator 5 through battery 9 and inverter 10 so that a torque Tm (or a rotational speed Nm) of motor-generator 5 becomes target motor-generator torque tTm (or target motor-generator rotational speed tNm).

Integral controller 20 supplies solenoid electric currents corresponding to target first clutch transmitted torque capacity tTc1 and target second clutch transmitted torque capacity tTc2, to hydraulic pressure regulating solenoids (not shown) of first clutch 6 and second clutch 7.

Integral controller 20 performs engagement force control of each of first clutch 6 and second clutch 7 so that a transmitted torque capacity Tc1 of first clutch 6 corresponds with target transmitted torque capacity tTc1, and so that a transmitted torque capacity Tc2 of second clutch 7 corresponds with target second clutch transmitted torque capacity tTc2.

Figure 8:
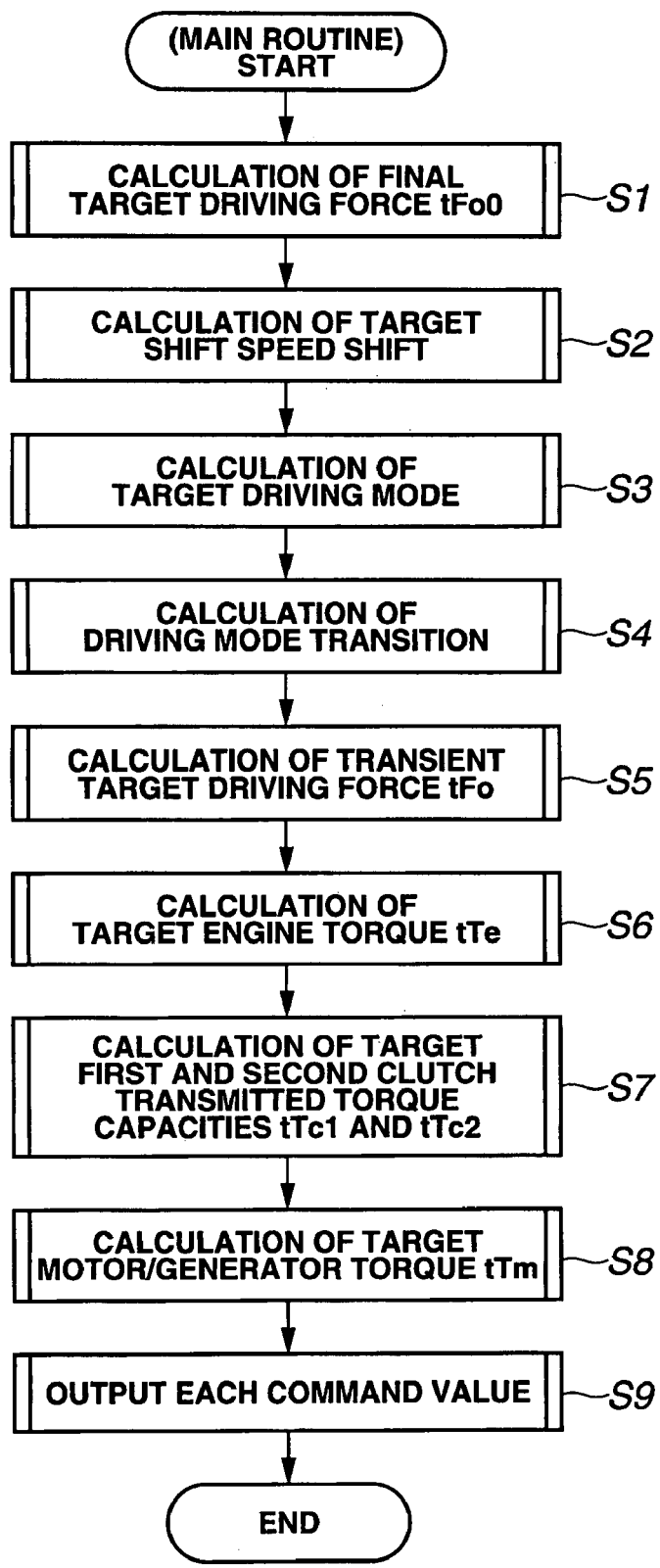
FIG. 8 is a flow chart showing a program of a basic driving force control performed by an integral controller in the control system.

Integral controller 20 performs the selection of the above described driving mode (the EV mode, the HEV mode), and calculations of target engine torque tTe, target motor-generator torque tTm, target first clutch transmitted torque capacity tTc1, and target second clutch transmitted torque capacity tTc2, by a main routine shown in FIG. 8.

First, step S1 calculates a stationary final target driving force tFo0 by using a predetermined final target driving force map, from accelerator opening APO and vehicle speed VSP.

Next step S2 determines a target shift speed SHIFT based on a predetermined shift map, from accelerator opening APO and vehicle speed VSP. Step 9 orders this target shift speed to a shift control section (not shown) of automatic transmission 3, so that automatic transmission 3 is shifted to target shift speed SHIFT.

Step S3 determines a target driving mode (EV mode, HEV mode), from accelerator opening APO and vehicle speed VSP, by using a target driving mode region map. In general, and for example, the above-described target driving mode region map is defined so that the HEV mode is applied as the target driving mode at the large load (large accelerator opening) and high vehicle speed, and that the EV mode is applied as the target driving mode at the low load and the low vehicle speed.

Next step S4 performs a driving mode transition calculation by comparison between a current driving mode and the above-described target driving mode, as described below.

In a case in which the current driving mode corresponds to the target driving mode, step S4 orders to hold the EV mode or the HEV mode of the current driving mode.

In a case in which the current driving mode is the EV mode and the target driving mode is the HEV mode, step S4 orders the mode switching from the EV mode to the HEV mode.

In a case in which the current driving mode is the HEV mode and the target driving mode is the EV mode, step S4 orders the mode switching from the HEV mode to the EV mode.

Step S9 outputs these commands so as to perform the mode holding and the mode switching as ordered.

Step S5 calculates a transient target driving force tFo at each time which is necessary for transition from the current driving force to final target driving force tFo0 determined at step S1 by response with a predetermined correction amount.

In this calculation, for example, transient target driving force tFo may be set to an output gained by passing final target driving force tFo0 through a low-pass filter of a predetermined time constant.

Step S6 determines target engine torque tTe necessary for attaining transient target driving force tFo with motor-generator 5 or alone, in accordance with the driving mode (the EV mode, the HEV mode) and the mode switching, from transient target driving force tFo, an effective tire radius Rt of driving wheels 2, a final gear ratio if, a gear ratio iG of automatic transmission 3 which is determined by the current selected shift speed, input rotational speed Ni of automatic transmission 3, engine rotational speed Ne, and a target discharge electric power tP according to battery state of charge SOC (the usable electric power).

Step S9 commands thus-determined target engine torque tTe to engine controller 21 of FIG. 7, and engine controller 21 controls engine 1 to attain target engine torque tTe.

Step S7 determines target transmitted torque capacities tTc1 and tTc2 necessary for achieving transient target driving force tFo or necessary for carrying out the mode switching, in accordance with the driving mode (the EV mode, the HEV mode) and the mode switching.

Step S9 orders thus-determined target transmitted torque capacities tTc1 and tTc2 to first clutch 6 and second clutch 7 of FIG. 7, and performs the engagement force control of each of first clutch 6 and second clutch 7 so as to become target transmitted torque capacities tTc1 and tTc2.

Step S8 determines target motor-generator torque tTm necessary for attaining transient target driving force tFo with engine 1 or alone, in accordance with the driving mode (the EV mode, the HEV mode) and the mode switching, from transient target driving force tFo, effective tire radius Rt of driving wheels 2, final gear ratio if, gear ratio iG of automatic transmission 3 which is determined by the current selected shift speed, input rotational speed Ni of automatic transmission 3, engine rotational speed Ne, and target discharge electric power tP according to battery state of charge SOC (the usable electric power).

Step S9 orders thus-determined target motor-generator torque tTm to motor-generator controller 22, and motor-generator controller 22 controls motor-generator 5 to achieve target motor-generator torque tTm.

Figure 9:
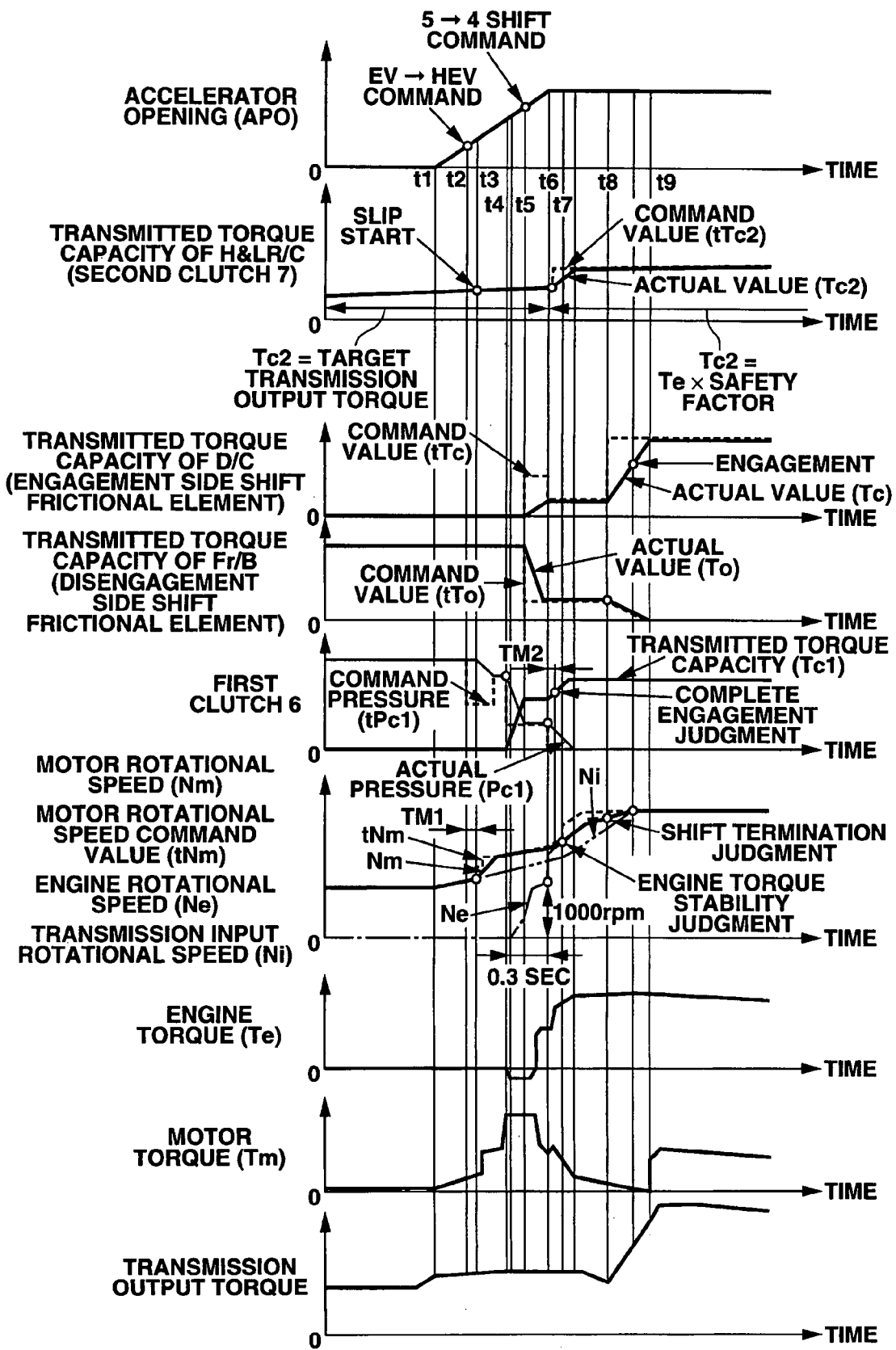
FIG. 9 is an operation time chart of an EV→HEV mode switching control and a 5→4 downshift control which are performed by the integral controller in the control system shown in FIG. 7.

The above-described explanation is illustrated about the general powertrain driving force control of the general hybrid vehicle. An example of the EV→HEV mode switching control according to the present invention is illustrated as shown in FIG. 9.

Specifically, for example, in a case in which the EV→HEV switching command is outputted and automatic transmission 3 is downshifted (shifted) from the fifth speed to the fourth speed when accelerator opening APO is increased by the depression of the accelerator pedal after instant t1 will be illustrated below.

As described above, the EV→HEV mode switching is the switching from the electric running (EV) mode to drive driving wheels 2 by only power from motor-generator 5 by disengaging first clutch 6, stopping engine 1, and engaging second clutch 7, to the hybrid running (HEV) mode and transmission 3 to a power transmitting permission state to drive driving wheels 2 by the power from engine 1 and motor-generator 5 by starting engine 1 by the power passing through the first clutch by engaging first clutch 6. Accordingly, the EV→HEV mode switching is performed by engaging first clutch 6, and by performing the driving force control of motor-generator 5.

Moreover, the above-described downshift of automatic transmission 3 from the fifth speed to the fourth speed is attained by disengaging front brake Fr/B in the engagement state (referred to as disengagement side frictional element) and by engaging direct clutch D/C in the disengagement state (referred to as engagement side frictional element), as shown in arrows of the engagement logic diagram of FIG. 6.

High and low reverse clutch H&LR/C continuously keeps the engagement state during this shift as is clear from the engagement logic diagram of FIG. 6, so that automatic transmission 3 is brought to the transmitting state at both the fifth speed and fourth speed before and after the shift.

In the present example, high and low reverse clutch H&LR/C is used as second clutch 7 of FIG. 3. In FIG. 9, tTc2 designates the command value of that transmitted torque capacity, and Tc2 designates that actual value.

In FIG. 9, tTc designates the command value relating to the transmitted torque capacity of direct clutch D/C (the engagement side frictional element), and Tc designates that actual value.

In FIG. 9, tPc1 designates the command pressure of first clutch 6, Pc1 designates that actual pressure, and Tc1 designates the transmitted torque capacity.

However, first clutch 6 is engaged in a normal state (actual pressure Pc1=0) to maximize transmitted torque capacity Tc1 thereof. Transmitted torque capacity Tc1 is decreased as actual pressure Pc1 is increased to control to direct to that command pressure tPc1.

Moreover, in FIG. 9, rotational speed command value (motor rotational speed command value) tNm of motor-generator 5, actual rotational speed (motor rotational speed) Nm of motor-generator 5, engine rotational speed Ne of engine 1, transmission input rotational speed Ni of automatic transmission 3, engine torque Te of engine 1, motor torque Tm of motor-generator 5, and the transmission output torque are indicated.

As shown in FIG. 9, motor torque Tm and motor rotational speed Nm of motor-generator 5 are increased with the increase of accelerator opening APO (request driving force) from instant t1. Accordingly, transmitted torque capacity Tc2 of high and low reverse clutch H&LR/C of second clutch 7 is increased as shown in the diagram so as to transmit this motor torque Tm to driving wheels 2.

On the other hand, the engine power becomes necessary for the increase of accelerator opening APO (request driving force), and accordingly the EV HEV mode switching command from the electric running (EV) mode to the hybrid running (HEV) mode is outputted at instant t2. Consequently, first clutch 6 is rapidly brought to an engagement initiation immediate preceding state, by actual pressure Pc1 controlled to follow command pressure tPc1 decreased as a broken line (by precharge control and a standby control), so as to remain the transmitted torque capacity to zero.

To increase the rotation of motor-generator 5 for the engine starting, rotational speed command value tNm of motor-generator 5 is increased to the target value for the engine starting, from instant t3 at which set time TM1 elapses from instant t2 of the EV HEV mode switching, so that motor torque Tm is increased to follow motor rotational speed Nm accordingly.

Consequently, a slip state permitting slipping, as opposed to direct engagement, is started by the increase of motor torque Tm because transmitted torque capacity Tc2 of high and low reverse clutch H&LR/C of second clutch 7 corresponds to the transmission target output torque as mentioned above.

When rotational speed command value tNm of motor-generator 5 is increased to the target value for the engine starting as mentioned above, the increase of rotational speed command value tNm is performed in the second stage as shown in the diagram, so that the start of the above-described slip of high and low reverse clutch H&LR/C of second clutch 7 is smoothly performed.

Moreover, after the start of the slip of high and low reverse clutch H&LR/C of second clutch 7, rotational speed tNm of motor-generator 5 is set to a sum of the target rotational speed for the engine starting and the difference between the driving and driven rotational speeds of second clutch 7 (high and low reverse clutch H&LR/C).

After the initiation of the slip of second clutch 7 (high and low reverse clutch H&LR/C), the time period of the state that the difference between the driving and driven rotations of second clutch 7 is equal to or greater than the target rotation difference for the engine starting is monitored. From instant t4 that this time period reaches a predetermined time, command pressure tPc1 of first clutch 6 is decreased to become transmitted torque capacity Tc1 by starting the engagement of first clutch 6.

Engine 1 initiates the starting by transmitted torque capacity Tc1 by the start of engagement of first clutch 6, as is clear from waveform of engine rotational speed Nm and engine torque Te. At this time, command pressure tPc1 (transmitted torque capacity Tc1) immediate after instant t4 is determined so that engine rotational speed Nm is increased to 1000 rpm by, for example, 0.3 sec.

At instant t6 that the difference of the rotation between engine rotational speed Ne and rotational speed Nm of motor-generator 5 by the starting of engine 1, that is, the difference between the forward and reverse rotations of first clutch 6 becomes a small setting value to have no problem with the shock of the clutch engagement, command pressure tPc1 is set to zero. Subsequently, transmitted torque capacity Tc1 is directed to the maximum value for completely engaging first clutch 6 by actual pressure Pc1 controlled to decrease.

At instant t5 of the 5→4 downshift command between instant t4 and instant t6, transmitted torque capacity command value tTo of front brake Fr/B of the disengagement side frictional element is decreased to a value corresponding to the transmitted torque capacity of high and low reverse clutch H&LR/C of second clutch 7, so that actual transmitted torque capacity To of front brake Fr/B of the disengagement side frictional element is decreased so as to follow transmitted torque capacity command value tTo.

Accordingly, front brake Fr/B of the disengagement side frictional element can slip, instead of high and low reverse clutch H&LR/C of second clutch 7. The start of the slip of front brake Fr/B is sensed, and transmitted torque capacity command value tTc2 of high and low reverse clutch H&LR/C is increased to a value necessary for complete engagement, so that high and low reverse clutch H&LR/C is completely engaged by actual transmitted torque capacity Tc2 controlled to follow this transmitted torque capacity command value tTc2. Accordingly, the replacement of the slip element from high and low reverse clutch H&LR/C to front brake Fr/B is performed.

At instant t5 of the 5→4 downshift command, direct clutch D/C of the engagement side frictional element is rapidly brought to the engagement initiation immediately preceding state by actual transmitted torque capacity Tc (by precharge control & standby control) controlled to follow transmitted torque capacity command value tTc decreased as shown in the broken line.

After the complete engagement judgment (the complete engagement judgment shown in FIG. 9) of first clutch 6 which starts the engagement for the engine starting after instant t4 as described before, at instant t7 that engine torque Te becomes stable (becomes tTc2−Tm>a setting value), rotational speed command value tNm of motor-generator 5 is increased to an after-shift target rotational speed by a predetermined time constant as shown by the broken line, and motor torque Tm is controlled so that motor rotational speed Nm follows accordingly.

On the above-described complete engagement judgment of first clutch 6 (shown as the complete engagement judgment in FIG. 9), it is possible to judge that first clutch 6 is completely engaged by either earlier one of a time when transmitted torque capacity Tc1 capable of being supposed from the stroke quantity of first clutch 6 becomes a specified value, or a time when predetermined time period TM2 elapses from instant t6.

At termination judgment time t8 of the 5→4 downshift by the replacement between the disengagement progress of front brake Fr/B of the disengagement side frictional element, and the engagement progress of direct clutch D/C of the engagement side frictional element as described above, for example, at instant t8 that transmission output rotational speed No reaching 90% of the final target value is judged, transmitted torque capacity command value tTo of front brake Fr/B of the disengagement side frictional element is directed to 0 by time variation gradient according to accelerator opening APO and vehicle speed VSP, and front brake Fr/B is completely disengaged from the slip state by actual transmitted torque capacity To controlled to follow accordingly. At the same time, transmitted torque capacity command value tTc of direct clutch D/C of the engagement side frictional element is set to 0, direct clutch D/C is completely engaged by actual transmitted torque capacity Tc controlled to follow accordingly. Consequently, the 5→4 downshift is completed at instant t9.

The timing of shifting from the completion of the EV→HEV mode switching control to the HEV mode control is a time that a predetermined margin time elapses from when the difference between driving and driven rotations of high and low reverse clutch H&LR/C of second clutch 7 becomes lower than a set value indicative of the completion of the engagement.

By the transmitting state switching control of the hybrid vehicle according to the example as illustrated above, in a case of the EV→HEV mode switching that the engine started by motor-generator 5 by engaging first clutch 6, next, in a case of the switching of transmitting path between motor-generator 5 and driving wheels 2 by the shift of automatic transmission 3, at first, transmitted torque capacity Tc2 of second clutch 7 is set to the transmitted torque capacity according to the driving force request value by the driver, and subsequently the transmitted torque capacity of the disengagement side frictional element (front brake Fr/B) is a value corresponding to transmitted torque capacity Tc2 of second clutch 7, that is, the transmitted torque capacity according to the driver. To perform the EV→HEV mode switching and the shift of automatic transmission 3, the driving force to driving wheels is held to the driving force corresponding to the driving force request value by the driver, and the EV→HEV mode switching and the shift of automatic transmission 3 are performed. It is possible to solve the above-mentioned problem as to the escape feeling and to solve the above-described problem of the shock by absorbing the torque variation by the slip of second clutch 7 or the disengagement side frictional element (front brake Fr/B).

Moreover, from the same reason, the torque of motor-generator 5 is set to a large value which exceeds the driving force request value by the driver, and it is possible to perform the starting of engine 1 by the redundancy of the motor-generator torque while holding the driving force to driving wheels 2, to the driving force according to the driving force request value by the driver. Moreover, it is possible to concurrently perform the shift during this engine starting by the disengagement of the disengagement side frictional element (front brake Fr/B) and the engagement of the engagement side frictional element (direct clutch D/C). Accordingly, it is possible to solve the other problem that the time period necessary for the engine starting and the shift is lengthened.

The above description illustrates the case in which there is the shift request after the EV HEV mode switching request (the engine starting request), and contrary a case in which there is the shift request before the EV→HEV mode switching request (the engine starting request) is a control shown in FIG. 10.

Subsequent to the EV mode state shown as a first I stage, second stage II sets transmitted torque capacity Tc2 of second clutch 7 to transmitted torque capacity according to the driving force requirement value by the driver, and brings to the state in which the second clutch can slip in response to the torque which exceeds the driving force request value.

At the disengagement of the disengagement side frictional element (front brake Fr/B) in response to the shift request, next third stage III sets transmitted torque capacity To of the disengagement side frictional element (front brake Fr/B) to a value corresponding to transmitted torque capacity Tc2 of second clutch 7, that is, the transmitted torque capacity according to the driving force requirement value by the driver, and disengages second clutch 7 to perform the replacement of the slip element from second clutch 7 to the disengagement side frictional element (front brake Fr/B).

In this state, a fourth stage IV starts the engagement of first clutch 6, and starts the starting control of engine 1 by the same above-described control of motor-generator 5.

After the initiation of the above-described starting control of engine 1, a fifth stage V continues the above-described transmitted torque capacity control of the disengagement side frictional element (front brake Fr/B), and brings to the state that the disengagement side frictional element (front brake Fr/B) can slip in response to the torque which exceeds the driving force request value by the driver.

Next VI stage sets transmitted torque capacity Tc of direct clutch D/C of the engagement side frictional element, to a value corresponding to transmitted torque capacity To of the disengagement side frictional element (front brake Fr/B), that is, the transmitted torque capacity according to the transmitted torque capacity request value by the driver, and disengages the disengagement side frictional element (front brake Fr/B) to perform the shift by the replacement from the disengagement side frictional element (front brake Fr/B) to the engagement side frictional element (direct clutch D/C).

During this shift, the torque down for preventing the shift shock is performed by the torque control of engine 1 or motor-generator 5.

In a seventh stage VII, the shift is finished by the completion of the above-described engagement of the engagement side frictional element (direct clutch D/C), and it is possible to attain the HEV running mode at the fourth speed after the shift. Motor-generator 5 assists the response delay of the engine in this time to prevent the shock.

In the above-described examples, the case that the disengagement side frictional element (front brake Fr/B) and the engagement side frictional element (direct clutch D/C) are different from each other is illustrated. Hereinafter, a case other than that case will be illustrated.

A case that disengagement side frictional element (front brake Fr/B) is commonly used as second clutch 7, and that there is a shift request before the EV→HEV mode switching request (the engine start request) is a control illustrated hereinafter with reference to FIG. 11.

This control corresponds to the control of FIG. 10 that third stage III is deleted. Subsequent to the EV mode state of first stage I, at the disengagement of the disengagement side frictional element (front brake Fr/B) in response to the shift request, second stage II sets transmitted torque capacity To of the disengagement side frictional element to the transmitted torque capacity according to the driving force request value by the driver, and brings to the state that the disengagement side frictional element (front brake Fr/B) can slip in response to the torque which exceeds the driving force request value.

In this state, next fourth stage IV starts the engagement of first clutch 6, and starts the starting control of engine 1 by the same above-described control of motor-generator 5.

After the start of the starting control of engine 1, fifth stage V continues the above-described transmitted torque capacity control of the disengagement side frictional element (front brake Fr/B), and brings to the state that the disengagement side frictional element (front brake Fr/B) can slip in response to the torque which exceeds the driving force request value by the driver.

Next sixth stage VI sets transmitted torque capacity Tc of direct clutch D/C of the engagement side frictional element, to a value corresponding to transmitted torque capacity To of the disengagement side frictional element (front brake Fr/B), that is, the transmitted torque capacity according to the driving force request value by the driver, and disengages the disengagement side frictional element (front brake Fr/B) to perform the shift by the replacement from the disengagement side frictional element (front brake Fr/B) to the engagement side frictional element (direct clutch D/C).

During this shift, the torque down for preventing the shift shock is performed by the torque control of engine 1 or motor-generator 5.

In seventh stage VII, the shift is finished by the completion of the above-described engagement of the engagement side frictional element (direct clutch D/C), and it is possible to attain the HEV running mode at the fourth speed after the shift. Motor-generator 5 assists the response delay of the engine in this time to prevent the shock.

FIG. 12 shows a control in a case in which the disengagement side frictional element (front brake Fr/B) is commonly used as second clutch 7 and there is a shift request after the EV→HEV mode switching request (the engine starting request).

This control corresponds to the control that is described above with reference to FIG. 9, except that the replacement stage from second clutch 7 to front brake Fr/B of the disengagement side frictional element is deleted.

Subsequent to the EV mode state of first stage I, second stage II sets transmitted torque capacity To of the disengagement side frictional element (front brake Fr/B) in the engagement state, to the transmitted torque capacity according to the driving force request value by the driver, and brings to the state in which the disengagement side frictional element (front brake Fr/B) can slip in response to the torque which exceeds the driving force request value.

In this state, next third stage III engages first clutch 6 in response to the engine starting request, and starts the starting control of engine 1 by the same above-described control of motor-generator 5.

After the start of the start control of engine 1, fourth stage IV continues the above-described transmitted torque capacity control of the disengagement side frictional element (front brake Fr/B), and brings to the state that the disengagement side frictional element (front brake Fr/B) can slip in response to the torque which exceeds the driving force request value by the driver.

In response to the shift request, next fifth stage V sets transmitted torque capacity Tc of direct clutch D/C of the engagement side frictional element to the value corresponding to transmitted torque capacity To of the disengagement side frictional element (front brake Fr/B), that is, the transmitted torque capacity according to the driving force request value by the driver, and disengages the disengagement side frictional element (front brake Fr/B) to perform the shift by the replacement from the disengagement side frictional element (front brake Fr/B) to the engagement side frictional element (direct clutch D/C). During this shift, the torque down for preventing the shift shock is performed by the torque control of engine 1 or motor-generator 5.

In sixth stage VI, the shift is finished by the completion of the above-described engagement of the engagement side frictional element (direct clutch D/C). Consequently, it is possible to attain the HEV running mode at the fourth speed after the shift. The shock is prevented by assisting the response delay at this time by motor-generator 5.

FIG. 13 shows a control in a case in which the engagement side frictional element (direct clutch D/C) is commonly used as second clutch 7 and there is the shift request before the EV→HEV mode switching request (the engine starting request).

Subsequent to the EV mode state of first stage I, second stage II sets transmitted torque capacity Tc of the engagement side frictional element (direct clutch D/C) in the disengagement state to the transmitted torque capacity according to the driving force request value by the driver, permits the engagement side frictional element (direct clutch D/C) to slip in response to the torque which exceeds the driving force request value, and starts the disengagement of front brake Fr/B of the disengagement side frictional element.

In this state, next third stage III starts the engagement of first clutch 6 in response to the engine starting request, and starts the starting control of engine 1 by the same above-described control of motor-generator 5.

After the start of the above-described starting control of engine 1, fourth stage IV continues the above-described transmitted torque capacity control of the engagement side frictional element (direct clutch D/C), and permits the engagement side frictional element (direct clutch D/C) to slip in response to the torque which exceeds the driving force request value by the driver.

In the next fifth stage V, the direct clutch D/C of the engagement side frictional element is engaged in response to the shift request, and the shift is performed by the replacement from the disengagement side frictional element (front brake Fr/B) to the engagement side frictional element (direct clutch D/C).

During this shift, the torque down for preventing the shift shock is performed by the torque control of engine 1 or motor-generator 5.

In sixth stage VI, the shift is finished by the completion of the engagement of the engagement side frictional element (direct clutch D/C), and it is possible to attain the HEV running mode at the fourth speed after the shift. The shock is prevented by assisting the response delay at this time by motor-generator 5.

FIG. 14 shows a control in a case in which the engagement side frictional element (direct clutch D/C) is commonly used as second clutch 7 and there is the shift request after the EV HEV mode switching request (the engine starting request).

Subsequent to the EV mode state of first stage I, second stage II sets transmitted torque capacity Tc of the engagement side frictional element (direct clutch D/C) in the disengagement state to the transmitted torque capacity according to the driving force request value by the driver, permits the engagement side frictional element (direct clutch D/C) to slip in response to the torque which exceeds the driving force request value, and starts the disengagement of front brake Fr/B of the disengagement side frictional element. In this state, the next third stage III starts the engagement of first clutch 6 in response to the engine starting request, and starts the starting control of engine 1 by the same above-described control of motor-generator 5.

After the start of the starting control of engine 1, fourth stage IV continues the above-described transmitted torque capacity control of the engagement side frictional element (direct clutch D/C), permits the engagement side frictional element (direct clutch D/C) to slip in response to the torque which exceeds the driving force request value by the driver, and finishes the disengagement of front brake Fr/B of the disengagement side frictional element during this time period.

In the next fifth stage V, direct clutch D/C of the engagement side frictional element is engaged in response to the shift request, and the shift is performed by the replacement from the disengagement side frictional element (front brake Fr/B) to the engagement side frictional element (direct clutch D/C). During this shift, the torque down for preventing the shift shock is performed by the torque control of engine 1 or motor-generator 5.

The shift is finished by the completion of the above-described engagement of the engagement side frictional element (direct clutch D/C), and it is possible to attain the HEV running mode at the fourth speed after the shift. The shock is prevented by assisting the response delay of the engine at this time by motor-generator 5.

FIG. 15 shows a control at the shift in the HEV mode in a case in which the disengagement side frictional element (front brake Fr/B) and the engagement side frictional element (direct clutch D/C) are different from each other.

When there is the shift command in the HEV mode, at first, first stage I sets transmitted torque capacity Tc2 of second clutch 7 in the engagement state, to the transmitted torque capacity according to the driving force request value by the driver, and brings to the state that second clutch 7 can slip in response to the torque which exceeds the driving force request value.

The next stage II sets transmitted torque capacity To of front brake Fr/B of the disengagement side frictional element to the value corresponding to transmitted torque capacity Tc2 of second clutch 7, that is, the transmitted torque capacity according to the driving force request value by the driver, and performs the replacement of the slip clutch from second clutch 7 to the disengagement side frictional element (front brake Fr/B) by the engagement of second clutch 7. Consequently, it is possible to slip the disengagement side frictional element (front brake Fr/B) in response to the torque which exceeds the driving force request value, instead of second clutch 7.

In this state, the next third stage III sets transmitted torque capacity Tc of the engagement side frictional element (direct clutch D/C) to the value corresponding to transmitted torque capacity To of the disengagement side frictional element (front brake Fr/B), that is, the transmitted torque capacity according to the driving force request value by the driver, and permits the engagement side frictional element (direct clutch D/C) to slip in response to the torque that exceeds the driving force request value, instead of the disengagement side frictional element (front brake Fr/B). Moreover, the third stage III disengages the disengagement side frictional element (front brake Fr/B) by disappearance of transmitted torque capacity To.

In the next fourth stage IV, direct clutch D/C of the engagement side frictional element is engaged in response to the shift request, and the shift is performed by the replacement from the disengagement side frictional element (front brake Fr/B) to the engagement side frictional element (direct clutch D/C).

Accordingly, it is possible to attain the HEV running at the fourth speed after the shift. The shock is prevented by assisting the response delay of the engine at this time by motor-generator 5.

Figure 16:
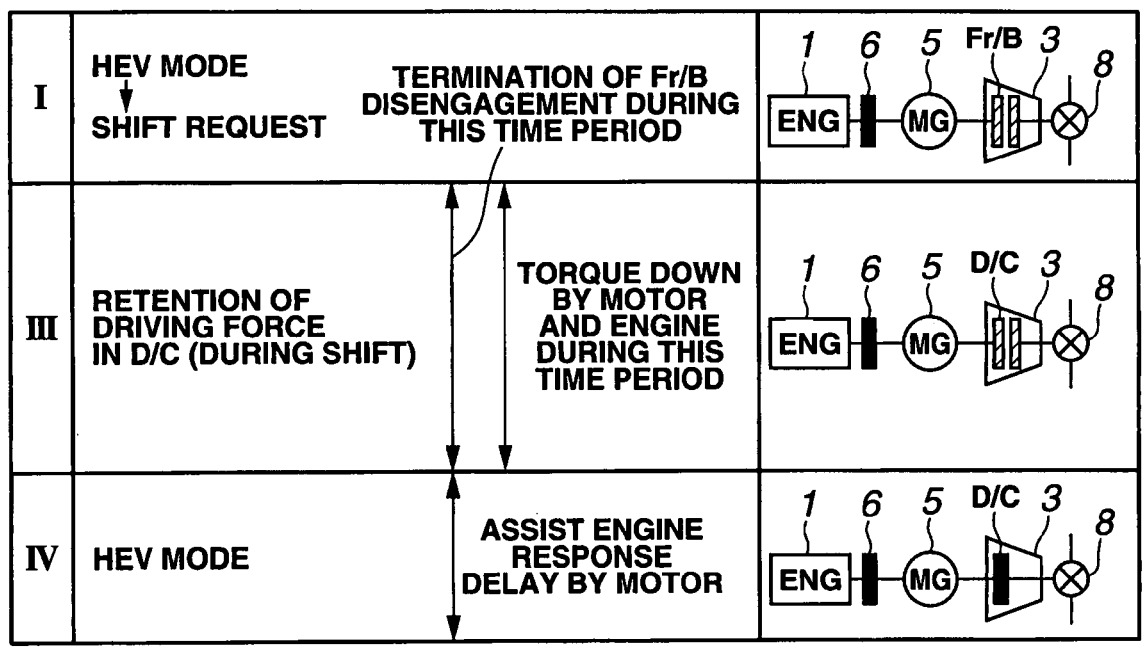
FIG. 16 is an operation time chart showing a shift control in the HEV mode in the case of using the disengagement side frictional elements as the second clutch.

FIG. 16 shows a control at a shift in the HEV mode in a case in which the disengagement side frictional element (front brake Fr/B) is commonly used as second clutch 7. This control corresponds to a control which the second stage II is deleted from FIG. 15, and which second clutch 7 of the first stage I is displaced by the disengagement side frictional element (front brake Fr/B).

That is, when there is the shift request in the HEV mode, at first, the first stage I sets transmitted torque capacity To of the disengagement side frictional element (front brake Fr/B) in the engagement state to the transmitted torque capacity according to the driving force request value by the driver, and permits the disengagement side frictional element (front brake Fr/B) to slip in response to the torque which exceeds the driving force request value.

The next third stage III sets transmitted torque capacity Tc of the engagement side frictional element (direct clutch D/C) to the value corresponding to transmitted torque capacity To of the disengagement side frictional element (front brake Fr/B), that is, the transmitted torque capacity according to the driving force request value by the driver, and permits the engagement side frictional element (direct clutch D/C) to slip in response to the torque which exceeds the driving force request value, instead of the disengagement side frictional element (front brake Fr/B). Moreover, the third stage III disengages the disengagement side frictional element (front brake Fr/B) by the disappearance of transmitted torque capacity To.

In the next fourth stage IV, direct clutch D/C of the engagement side frictional element is engaged in response to the shift request, and the shift is performed by the replacement from the disengagement side frictional element (front brake Fr/B) to the engagement side frictional element (direct clutch D/C). Accordingly, it is possible to attain the HEV running at the fourth speed after the shift. The shock is prevented by assisting the response delay of the engine at this time by motor-generator 5.

Figure 17:
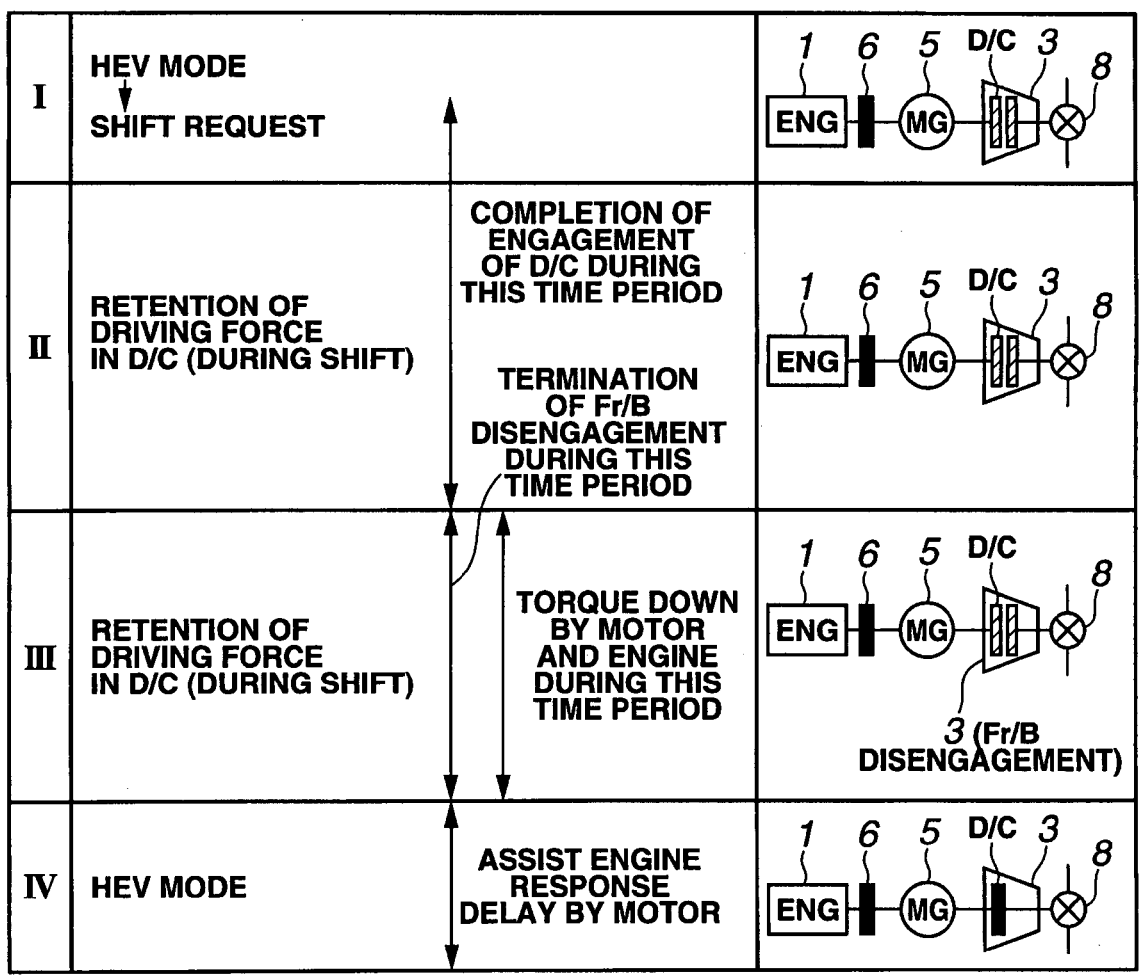
FIG. 17 is an operation time chart showing a shift control in the HEV mode in the case of using the engagement side frictional elements as the second clutch.

FIG. 17 shows a control at a shift in the HEV mode that the engagement side frictional element (direct clutch D/C) is commonly used as second clutch 7.

When there is the shift command in the HEV mode, at first, the first stage I sets transmitted torque capacity Tc of the engagement side frictional element (direct clutch D/C) in the disengagement state to the transmitted torque capacity according to the driving force request value by the driver, and permits the engagement side frictional element (direct clutch D/C) to slip in response to the torque which exceeds the driving force request value.

The second stage II keeps the engagement side frictional element (direct clutch D/C) to the above-described transmitted torque capacity control state.

In this state, in the next third stage III, the engagement side frictional element (direct clutch D/C) is disengaged by decreasing transmitted torque capacity To of the disengagement side frictional element (front brake Fr/B).

The shift is performed by the replacement from the engagement side frictional element (direct clutch D/C) to the disengagement side frictional element (front brake Fr/B), by the disengagement of the engagement side frictional element (direct clutch D/C) and the engagement of the engagement side frictional element (direct clutch D/C) in the fourth stage IV.

Accordingly, it is possible to attain the HEV running at the fourth speed after the shift. The shock is prevented by assisting the response delay of the engine at this time by motor-generator 5.

By the EV→HEV mode switching (the engine starting) control described above with reference to FIGS. 10-17 and the shift control in the HEV mode, it is possible to attain the same operation and the same effect as described above with reference to FIG. 9.

In the above description, the 5→4 downshift of automatic transmission 3 is not performed through the one-way clutch as is clear from the logic diagram of FIG. 6.

Accordingly, as illustrated with reference to FIGS. 9-12, the engagement side frictional element (direct clutch D/C) is rapidly brought to the engagement immediately preceding state by the precharge and standby control.

In the shift of a case in which the one-way clutch to prohibit the reverse driving from driving wheels 2 to engine 1 by idle running is provided in the transmission system which generates by the engagement of the engagement side frictional element engaged at the shift, the engagement of the engagement side frictional element is performed by the self-engagement without delay. Complicated precharge and standby control of the engagement side frictional element can be avoided.

In the above description, the 5→4 downshift of automatic transmission holds the engagement state of high and low reverse clutch H&LR/C during this shift, and high and low reverse clutch H&LR/C is used as second clutch 7 (see FIG. 3). Accordingly, there is no need for providing a new second clutch 7 as shown in FIGS. 1 and 2, and it is advantageous in the cost and the space.

It is also possible to attain this effect and the operation by using, as second clutch (see FIG. 3), the disengagement side frictional element (front brake Fr/B) which is disengaged from the engagement state at the 5→4 downshift of automatic transmission 3, or conversely by using, as the second clutch 7 (see FIG. 3), the engagement side frictional elements (direct clutch D/C) engaged from the disengagement state at that shift, so as not to provide new second clutch 7 as shown in FIG. 1 and FIG. 2.

In this way, in the case in which the disengagement side frictional element (front brake Fr/B) is used as second clutch 7 (see FIG. 3) and the engagement side frictional element (direct clutch D/C) is used as second clutch 7 (see FIG. 3), the transmitted torque capacity of the disengagement side frictional element (front brake Fr/B) or the engagement side frictional element (direct clutch D/C) serving as second clutch 7 is continuously held to the transmitted torque capacity according to the driving force request value by the driver, and accordingly it is possible to attain the same effect and the operation as described with reference to FIG. 9.

It will be noted that when the vehicle is in the electric mode, first clutch 6 is disengaged and transmission 3 is brought to a power transmitting permission state. When the vehicle is in hybrid running mode, first clutch 6 is engaged and transmission 3 is adapted to the power transmitting state in response to a requested vehicle driving force.

In the each example described above, the termination judgment of the replacement between the transmitted torque capacity control of the second clutch and the transmitted torque capacity control of the disengagement side frictional elements is performed by the transmitted torque capacity of the disengagement side frictional element, the difference of the driving and driven rotations of the clutch, and the elapse of the setting time period, and that the second clutch is engaged at the replacement termination judgment.

In the each example as described above, the initiation of the disengagement of the disengagement side frictional element and the initiation of the engagement of the engagement side frictional element can be set to a time that the effective gear ratio between the motor-generator and the engine becomes the setting gear ratio, or the time that the setting time elapses from the request of the shift.

It will finally be understood that the disclosed embodiments are representative of the invention, but are intended to be illustrative rather than definitive of the invention. The scope of the invention is defined by the following claims.

What is claimed is:

1. An apparatus for controlling a hybrid vehicle having an engine, a motor-generator, and clutch disposed between the engine and the motor and configured to vary a transmitted torque capacity, comprising:
   a transmission disposed between the motor-generator and at least one driving wheel having at least two power transmitting paths through the selective engagement of a plurality of frictional engagement elements; and
   a controller configured to:
   perform a transition of the vehicle from an electric running mode wherein the clutch is disengaged to a hybrid running mode wherein the clutch is engaged and the engine is started, the transition responsive to a request for start up of the engine;
   determine a need for a shift of the transmission responsive to a request for driving force for the vehicle, at least a first frictional engagement element changing from being engaged before the shift to being disengaged after the shift or changing from being disengaged before the shift to being engaged after the shift;
   responsive an earlier of a determination of the need for the shift and the request for start up of the engine, permit a first slip state where one of the first frictional engagement element and a second frictional engagement element is allowed to slip while the other of the first frictional engagement element and the second frictional engagement element is not allowed to slip;
   during the transition, perform a switch to permit a second slip state where the other of the first frictional engagement element and the second frictional engagement element is allowed to slip and the one of the first frictional engagement element and the second frictional engagement element allowed to slip in the first slip state is not allowed to slip, each of the first slip state and the second slip state controlling the driving force transmitted to the at least one driving wheel; and
   complete the shift by preventing both the first frictional engagement element and the second frictional engagement element from slipping.

2. The apparatus of claim 1 wherein the start up of the engine and the shift of the transmission are performed at the same time after a progression of engagement of clutch during the electric running mode of the vehicle.

3. The apparatus of claim 1 wherein the shift is a downshift.

4. The apparatus of claim 1 wherein the second frictional engagement element is engaged before and after the shift and the first frictional engagement element is disengaged after the shift.

5. The apparatus of claim 1 wherein the first frictional engagement element is engaged before the shift and disengaged after the shift and the second frictional engagement element is disengaged before the shift and engaged after the shift.

6. The apparatus of claim 1 wherein the first and the second frictional engagement elements are positioned in the transmission.

7. The apparatus of claim 1 wherein one of the first and the second frictional engagement elements comprises a clutch external of the transmission and located between the motor-generator and the at least one driving wheel.

8. The apparatus of claim 1 wherein that of the first frictional engagement element and the second frictional engagement element disengaged after the shift is slipped during the first slip state and that of the first frictional engagement element and second engagement element engaged after the shift is slipped during the second slip state.

9. The apparatus of claim 4 wherein the second frictional engagement element is allowed to slip during the first slip state and the first frictional engagement element is allowed to slip during the second slip state.

10. The apparatus of claim 5 wherein the first frictional engagement element is allowed to slip during the first slip state and the second frictional engagement element is allowed to slip during the second slip state.

11. The apparatus of claim 5 wherein second frictional engagement element is allowed to slip during the first slip state and the second frictional engagement element is allowed to slip during the second slip state.

12. The apparatus of claim 1 wherein a transmitted torque capacity of the transmission during the first slip state and the second slip state is held substantially continuous even when the driving force requested is varied during the transition.

13. An apparatus for controlling a hybrid vehicle having an engine, a motor-generator, and a clutch disposed between the engine and the motor and configured to vary a transmitted torque capacity, comprising:
   a transmission disposed between the motor-generator and at least one driving wheel having at least two power transmitting paths through the selective engagement of a plurality of frictional engagement elements; and
   a controller operable to transition the vehicle from an electric running mode to a hybrid running mode and wherein the controller is configured to selectively permit a slip state where at least one of the frictional engagement elements is allowed to slip during transition to the hybrid running mode from the electric running mode so as to control the driving force transmitted to the at least one driving wheel;
   wherein the slip state of the selected at least one of the frictional engagement elements is conditioned on a requested shift of the transmission in response to a requested driving force of the hybrid vehicle;
   wherein the selected at least one of the frictional engagement elements permitted to slip is switched during an engine starting process during the start-up of the hybrid running mode; and
   wherein the switching of the frictional engagement element during the engine starting process first brings a frictional engagement element engaged after the shift, to the slip state, and then switches a frictional engagement element disengaged after the shift, to the slip state.

14. The apparatus of claim 13 wherein the switching to the slip state is performed from a time that the request of the shift arises to a time that the frictional engagement element engaged after the shift is engaged.

15. The apparatus of claim 13 wherein the slip state is conditioned on the transmitted torque capacity, the transmitted torque capacity is held substantially continuous during the start-up of the hybrid running mode even when the requested driving force by the vehicle is varied during the start-up of the hybrid running mode.

16. A hybrid vehicle, comprising:
   an engine;
   a motor-generator;
   a clutch disposed between the engine and the motor-generator configured to vary a transmitted torque capacity;
   a transmission disposed between the motor-generator and at least one driving wheel having at least two power transmitting paths through selective engagement of a plurality of frictional engagement elements; and
   a controller configured to transition the vehicle from an electric running mode, where the clutch is disengaged, to a hybrid running mode, where the clutch is engaged and the engine has started, and permit a slip state such that each of the plurality of frictional engagement elements that changes state from being engaged before the shift to being disengaged after the shift or from being disengaged before the shift to being engaged after the shift is allowed to slip during the transition so as to control the driving force transmitted to the at least one driving wheel.

17. The vehicle of claim 16 wherein the controller is configured to permit the slip state by first allowing a first frictional engagement element disengaged after the shift to slip and then switching to allow a second frictional engagement element engaged after the shift to slip during the slip state, the second frictional engagement element not being allowed to slip while the first frictional engagement element is allowed to slip and the first frictional engagement element not being allowed to slip while the second frictional engagement element is allowed to slip.

18. A method for controlling a hybrid vehicle having an engine, a motor-generator, a clutch disposed between the engine and the motor and configured to vary a transmitted torque capacity, and a transmission disposed between the motor-generator and at least one driving wheel and having at least two power transmitting paths through the selective engagement of a plurality of frictional engagement elements, the method comprising:
   performing a transition of the vehicle from an electric running mode wherein the clutch is disengaged to a hybrid running mode wherein the clutch is engaged and the engine is started using a controller, the transition responsive to a request for start up of the engine;
   determining a need for a shift of the transmission responsive to a request for driving force for the vehicle using the controller, at least a first frictional engagement element changing from being engaged before the shift to being disengaged after the shift or changing from being disengaged before the shift to being engaged after the shift;
   responsive an earlier of determining the need for the shift and the request for start up of the engine, using the controller to permit a first slip state where one of the first frictional engagement element and a second frictional engagement element is allowed to slip while the other of the first frictional engagement element and the second frictional engagement element is not allowed to slip;
   during the transition, using the controller to perform a switch to permit a second slip state where the other of the first frictional engagement element and the second frictional engagement element is allowed to slip and the one of the first frictional engagement element and the second frictional engagement element allowed to slip in the first slip state is not allowed to slip, each of the first slip state and the second slip state controlling the transmission of the driving force to the at least one driving wheel; and completing the shift by the controller preventing both the first frictional engagement element and the second frictional engagement element from slipping.

19. The method of claim 18, further comprising:

holding a transmitted torque capacity of the transmission substantially constant during the first slip state and the second slip state even when the driving force requested is varied during the transition.

20. The method of claim 18, further comprising:

when the second frictional engagement element is engaged before and after the shift and the first frictional engagement element is disengaged after the shift, allowing the second frictional engagement element to slip during the first slip state and the first frictional engagement element to slip during the second slip state;

when the first frictional engagement element is engaged before the shift and disengaged after the shift and the second frictional engagement element is disengaged before the shift and engaged after the shift, allowing one of the first frictional engagement element to slip during the first slip state and the second frictional engagement element to slip during the second slip state, and the second frictional engagement element to slip during the first slip state and the first frictional engagement element to slip during the second slip state.

* * * * *